United States Patent [19]
Cheng et al.

[11] Patent Number: 5,721,925
[45] Date of Patent: Feb. 24, 1998

[54] METHOD FOR GENERICALLY INVOKING OPERATION IN AN OBJECT ORIENTED REPOSITORY

[75] Inventors: Leey Cheng, Laguna Hills; Uppili Ranagarajan Srinivasan, Irvine, both of Calif.

[73] Assignee: Unisys Corporation, Blue Bell, Pa.

[21] Appl. No.: 567,394

[22] Filed: Dec. 1, 1995

[51] Int. Cl.$^6$ ............................ G06F 9/00; G06F 17/30
[52] U.S. Cl. ............................ 395/683; 395/616
[58] Field of Search ............... 395/616, 618–620, 395/676, 680, 683, 685, 684

[56] References Cited

U.S. PATENT DOCUMENTS

| | | | |
|---|---|---|---|
| 5,226,161 | 7/1993 | Khoyi et al. | 395/683 |
| 5,557,793 | 9/1996 | Koerber et al. | 395/614 |
| 5,581,755 | 12/1996 | Koerber et al. | 395/614 |

*Primary Examiner*—Paul V. Kulik
*Attorney, Agent, or Firm*—J. Ronald Richebourg; Mark T. Starr; Steven R. Petersen

[57] ABSTRACT

The method of the present invention is a repository program operating in a computer system for invoking operations on objects stored in the repository. The method assigns a first set of unique numbers for each type in a model library and a second set of unique numbers for each operation in each type. The first and second set of unique numbers are stored in metadata of the repository. Router and helper functions are generated for translating a generic call to an actual C++ procedure at run time using one of the first and one of the second unique numbers, and compiling and linking the router and helper functions in a library of the model. If the operation is invokable, the first and second unique numbers are retrieved from metadata. They are then used with the generated router and helper functions in the library model for invoking the actual C++ procedure.

26 Claims, 32 Drawing Sheets

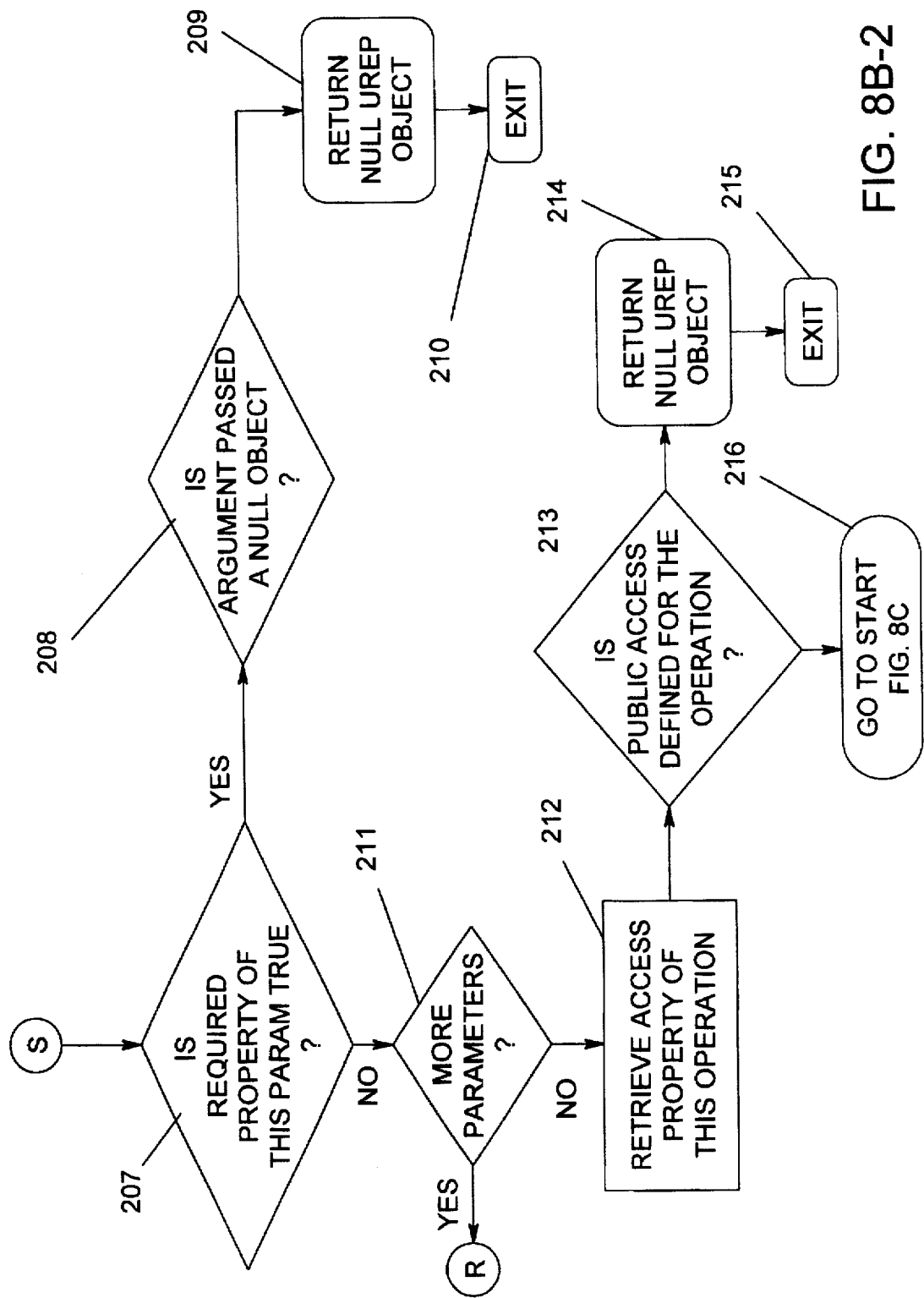

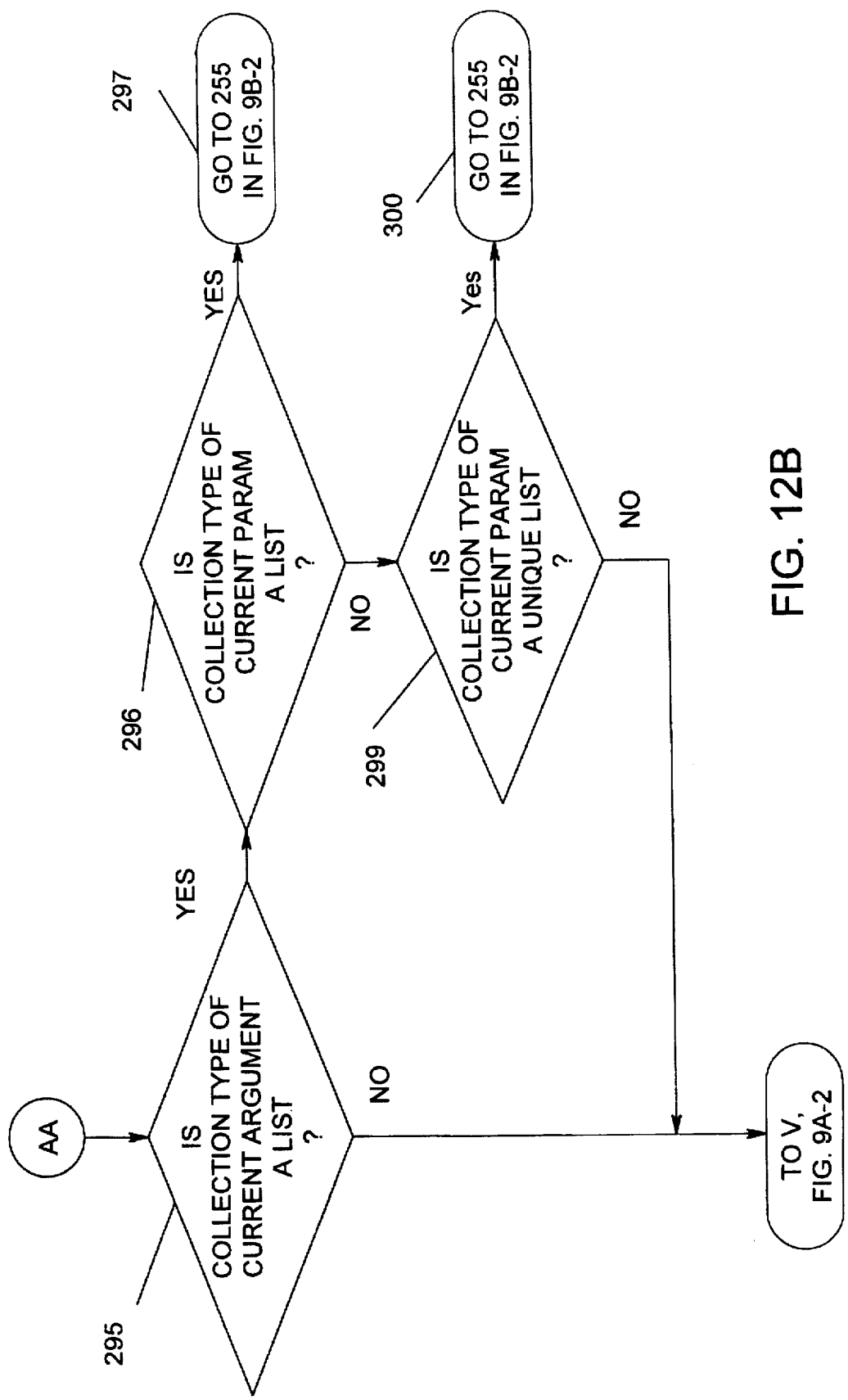

5,721,925

METHOD FOR GENERICALLY INVOKING OPERATION IN AN OBJECT ORIENTED REPOSITORY

FIELD OF THE INVENTION

The present invention relates in general to the field of repository databases and in particular to a method for generically invoking operations in an object oriented repository. The method of this invention operates with the repository's persistence service to provide for calling any public operation defined in a model library, thereby providing for dynamic execution of any operation at run-time.

BACKGROUND OF THE INVENTION

The storage and manipulation of data records or objects within a database application is well known in the prior art. A database allows one to store information in it; and it does not necessarily have any special meaning associated with the things that are stored in the database. A repository not only uses the database as a data store, but it is a layer above a database. A repository has information about the things stored in the database. A repository is like a card catalog that is found in the library, with the library being analogous to the database.

With the advent of repositories, improvements in the accessibility of data within databases has improved. However, as these repositories have become larger and more complex a method is required for generically invoking operations on objects stored within the repository.

BRIEF SUMMARY OF THE INVENTION

The method of the present invention is useful in an object-oriented repository for invoking a specified operation by simply specifying its name and passing the list of specified arguments for the operation to the repository. That is, the operation to be invoked is defined on any of the persistence types in a model library, and the operation is specified by name. The type hierarchy stored in the metadata of the repository is searched for an operation that has the same name and set of parameters. If the operation is found, it is invoked. This operation adheres to the rules of virtual functions, overload operation, multiple inheritance, and has two variations. The first variation invokes operations that are not defined as class features (i.e., non-static operations). The second variation invokes operations that are defined as class features (i.e., static operations).

It is therefore an object of the present invention to provide an improved repository system.

It is another object of the present invention to provide an improved repository which supports a method for invoking operations on objects stored within the repository.

Yet another object of the present invention is to provide a method to generically call any public operation defined in a model thereby providing for dynamic execution of any operation at run time.

Still another object of the present invention is to provide a method for dynamic execution of any operation defined in the model at run-time.

The foregoing objects are achieved as is now described. The method of the present invention is useful in a computer system having a user interface, a memory, a repository and a database, a repository program operating in the computer system for invoking operations on objects stored in the repository. The program executes a method comprising the steps of assigning a first set of unique numbers for each type in a model library and a second set of unique numbers for each operation in each type; storing the first and second set of unique numbers in the metadata of the repository; generating router and helper functions that translate a generic call to an actual C++ procedure at run time using one of the first and one of the second unique numbers, and compiling and linking the router and helper functions in a library of the model. With the use of a search routine, traversing type hierarchy to find the operation to be invoked. If the to be invoked operation is found, using a validation routine, to verifying the signature of the found operation. If the signature is verified, validating static versus non-static call, required versus optional for each parameter, and security access of the operation. If the operation is invokable, retrieving one of the first and one of the second unique numbers and the operation from the metadata. With the use of one of the first and the one of the second unique numbers and the generated router and helper functions in the library of the model, then the actual C++ procedure is invoked. The step of using a search routine and each step thereafter is repeated for each invoking operation call.

BRIEF DESCRIPTION OF THE DRAWINGS

FIGS. 7A-1, 7A-2, 7B-1, 7B-2, 7C and 7D combined form a flow chart illustrating the process for generating helper functions that call the actual C++ procedure for the invoked operation using the unique numbers retrieved from the metadata.

FIGS. 8A-1 and 8A-2 a flow chart illustrating the steps of the process for initial validation for the given model, type and operation.

FIGS. 8B-1 and 8B-2 is a flow chart illustrating the steps of the process for validating the call, required versus optional for each parameter, and security access of the operation.

FIGS. 9A-1 and 9A-2 is a flow chart illustrating the steps of the process for traversing the type hierarchy in the metadata for the given model, type and operation. This adheres to the rules of the virtual function, overloaded operation and multiple inheritance.

FIGS. 9B-1 and 9B-2 is a flow chart illustrating the steps of the process for verifying the signature of the operation.

FIG. 12A and 12B combined form is a flow chart illustrating the process for determining if collectionType of the currentParam and currentArgument is the same.

DETAILED DESCRIPTION

Before proceeding with a detailed description of the method of the present invention a background discussion of repositories in which the present invention is useful would be helpful. In general, a repository enables the user to store, manage, share and reuse information about the information system in which the repository is used. The repository enables the user to store more than just the data that is processed by an information system. For example, definition data stored in the repository may be information about the development of applications; including descriptions of data, programs and system objects. It may also include information about relationships among data, programs and system objects; as well as the semantics and use of the information.

Examples of definition information might include the files and programs that form a salary administration application. This application might define the minimum and maximum salaries at a given level. Another example is management information used to manage and maintain definition information. Management information also describes who can use definition information and when, where and why the information is used. For example, the salary administration application might be accessible only to a select group of repository users.

Yet another example is operational information about the environment in which the user operates. Examples of this information include system configuration, backup information and schedules.

Figure 1:
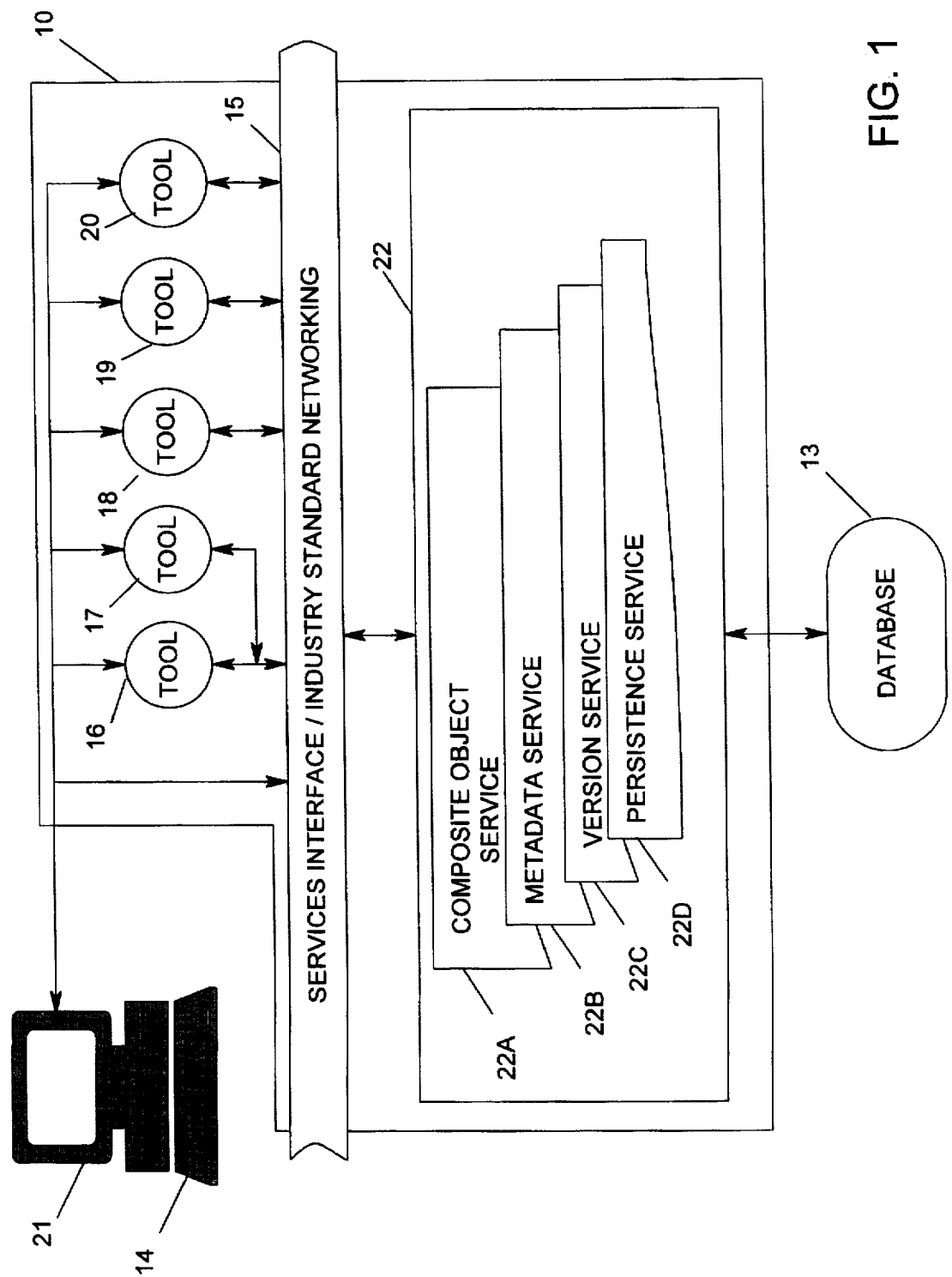
FIG. 1 is a block diagram of a repository showing the various components of software that support the repository (including the method of the present invention) with connections to an information system.

Referring now to the drawings and FIG. 1 in particular, a block diagram is shown of a computer system including a repository 10 that may use the method of the present invention. The repository 10 is illustrated as being supported by or a part of an information system 12 having a user interface 14. Tools 16–20 (such as CASE tools), which are integrated within the repository 10, are coupled to a services interface 15. The tools 16 and 17 are coupled to the interface 15 by means of an interface agent identified as Portable Common Tool Environment ("PCTE"), tool 18 is coupled to the interface 15 by means of an Information Resource Dictionary System ("IRDS") and tool 20 is coupled to the interface by means of an Electronic Industry Associates ("EIA") interface agent. The point here is to illustrate the flexibility of use of a variety of tools and interface agents with the repository 10.

An administrator 21 manages the repository 10, the database 13 and the environment around the repository. The administrator 21 is typically a work station that can manage a single repository or a network of repositories.

A service library 22 provides the functionality that enables the user to store, manage and reuse repository information. Examples of services within the library 22 are Composite Object Service 22a, which is disclosed in U.S. Pat. No. 5,557,793 assigned to the assignee of this application and entitled IN AN OBJECT ORIENTED REPOSITORY, A METHOD OF TREATING A GROUP OF OBJECTS AS A SINGLE OBJECT; and MetaData Service 22b, which is disclosed in U.S. Pat. No. 5,644,764 also assigned to the assignee of this application and entitled A METHOD FOR SUPPORTING OBJECT MODELING IN A REPOSITORY. Another library service, Version Service 22c, is disclosed in U.S. Pat. No. 5,581,755 assigned to the assignee of this application and entitled A METHOD FOR MAINTAINING A HISTORY OF SYSTEM DATA AND PROCESSES FOR AN ENTERPRISE. Yet another library service, Persistent Service 22d, is the subject of this patent application. It is noted that many more types of library services may form a part of such a repository, the details of which are beyond the scope of this disclosure.

The repository employing the present invention provides a client/server architecture in which clients, i.e. tools 16–20, request services form the server, i.e. the repository 10 and its service library 22. In return, the repository and its service library 22 respond to requests from client tools 16–20. A repository client is software that accesses or modifies information that is maintained by the repository. The repository client uses the service library 22 (i.e., the server), which includes software integrated into the repository to manage repository information and provide services to users of that information. It is noted that software in the repository can act both as a repository client when the software is requesting a service from some other repository software and as a repository server when the software is providing a service to some other repository software.

It is pointed out that a SPARC system manufactured by Sun Microsystems, Inc. of Mountain View, Calif., was used for executing one embodiment of the method of the present invention, which method was written in C++ programming language.

As a repository user, one can access the information in the repository through the tools 16–20 that have been integrated within the repository. In the context of a repository, a "tool" is any application software that creates, modifies or uses information in the repository. Tools primarily use the repository for sharing information with other tools and tool users. For example, a COBOL compiler and a user-interface tool can share the definition of a data structure. Tools also benefit from using the repository services that provide features such as a version control and network distribution. A wide variety of tools serving many diverse purposes can use a repository. A catalog of such tools includes integrated computer-aided software engineering (CASE) and fourth generation language (4GL) tools, enterprise modeling tools, analysis and design specification tools, project planning tools, word processors, graphics tools, source code editors, compilers, linkers, debuggers, etc.

The persistence service 22d enables the user to define a complex structure in the repository and to keep track and maintain objects of that structure. For example, to store a complex program in the repository the user might define one type to represent the program as a whole, one type to represent the code modules, and another type to represent the data files. The user then stores the actual code modules and data files as instances of these types. The program object is the composite object that links the modules and files to represent the unified program. The method of the present invention operates in conjunction with the persistence service 22d.

At this juncture of the description several definitions would be helpful.

Types

A type is a template that describes a set of features—the state and behavior—that an object or another type can possess. A type defines a pattern that can be used to create or identify objects; it does not contain the actual object. A model is defined by a hierarchy of types.

Most types define the structure of repository objects as the features the objects can have. Data types define the values associated with the features. (Data types are also known as primitive types.) For example, data types are used to define attribute values, operation parameters, and operation return values. The values represented by the data types do not exist as separate objects in the repository. Instead, they are always sorted as part of a repository object.

Persistent types define objects that continue to exist within the repository beyond the execution of a particular tool or of the repository. These persistent objects are essentially permanent—they remain in the repository until they are explicitly deleted by users. The majority of repository types are persistent, and the steps for defining, tracking and maintaining such types is the subject of this application.

A transient type defines a temporary object that will be automatically deleted when the function or program in which the object was created exists or terminates. Transient types are provided in the model to support exchange of data between an application and the repository.

A type that can be used to define other types and objects is said to be instantiable. Objects derived from a type are called instances of that type. Types derived from a type are called subtypes of that type. Instances and subtypes of a type inherit the features—attributes, references, and operations—defined for that type. The repository User type is an example of an instantiable type. A type that is used to define only other types and not objects is said to be abstract.

A type that is derived from one or more other types is called a subtype. The definition of a subtype identifies the type or types from which it is derived. A type from which a subtype is derived is called the supertype. The definition of a supertype identifies the subtypes derived from it. A type cannot be a supertype or a subtype of itself. A subtype inherits all the features of its supertype. It can be customized by adding new features. The structure created by deriving types from other types is called a hierarchy. The hierarchy shows the relationship of the supertypes and subtypes. A hierarchy has a single base type. The base type is the highest supertype in the hierarchy.

In addition to features defined specifically for a subtype, each subtype acquires the features defined for the supertype. This trait is called inheritance. For example, managers have all of the features defined in Manager, and they inherit all of the features of Employee as well. Hence, if the Employee type has a feature such as name, we can ask for the name of a manager since Manager is a subtype of Employee.

Features

A feature defines some element of either the state or the behavior that objects can possess. A feature is defined for a type, but applied to the corresponding objects. The repository has two kinds of features: operations and properties. For example, the Employee type might define the features name, birthDate, salary, and setSalary. Each employee object is subsequently considered to possess these features. That is, each employee has a name, a birth date, and salary. The employee's salary can be modified by using the setSalary feature.

There are two basic categories of features: properties and operations. Properties define state. For example, the salary feature is a property that defines an employee's current salary. Operations define behavior. For example, the setSalary feature is an operation that defines the mechanism for changing an employee's salary.

Properties

A property is a feature that represents a state that objects can possess. (In some models, properties are called instance variables.) A property can represent either a single value or a set of values. Properties are further divided into attributes, whose values are embedded within the owning objects, and references, whose values are independent objects.

The repository supports the following kinds of properties:

Attribute
    A property for which the value is embedded within the owning object. For example, an employee's social security number can be defined as an attribute whose value is stored as a string within the employee object.

Reference
    A property for which the value is maintained outside the owning object. For example, the employee's manager can be defined as a reference that identifies a separate employee object that represents the manager.

Every property has a domain that identifies the objects that the value of the property can hold. The domain is defined as a type. Objects that are instances of the type are legal values for the property. For example, the domain of the boss property of the Employee type might be specified as the Manager type. Therefore, only a manager object can be designated as the boss of an employee.

When an object is first created, none of its properties have values until they are implicitly assigned a default value or explicitly assigned a value by the construct operation. Until a property has a value it is considered undefined. For properties that are references, the value is considered null. The state of being null is not a value itself. Rather, it means that no value exists.

A property for which the value is embedded within the owning object is called an attribute. Such a property typically is used for simple values that are not shared between multiple owning objects. For example, the Employee property birthDate is simply a Date object—that is, the domain of the birthDate property is the Date type. If one employee's birthDate property is changed, the change does not affect other employees whose birthDate property is the same date. Consequently, each employee object should use a "private" date object that is embedded within it—that is, as an attribute.

A property for which the value is maintained outside the owning object is called a reference. For a reference, the owning object points to the value object. One reason for defining a property as a reference is to allow object sharing. A reference enables two or more owning objects to have the same value for a property. All owning objects can point to the same value object. For example, if two employees have the same manager as a boss, they share the same manager object. Consequently, any changes to the manager (such as changing his or her name) are reflected when the boss reference is accessed for all employees that have that boss.

A property that has one value for each object is said to be single valued. For example, each employee has one name and one birth date. A property that has more than one value for each object is said to be multi-valued. For example, each manager manages multiple employees, so the staff property for a manager object must be able to reference multiple values. A multi-valued property is defined by specifying a collection as its domain. A collection represents a set of values. A collection provides the ability to count the values defined for a multi-valued property, to add new values to the property, and to delete existing values.

The repository supports several types of collections, each of which organizes elements in a different manner. This capability enables the user to:

Store and retrieve the elements in a special order; and,

Search for elements in a special way.

The collection types supported by the repository are summarized in the following table:

| Type | Description |
| --- | --- |
| Array | Creates a dynamic array of objects in which an integer index can be used to access array members. An array can contain duplicate objects. |
| List | Creates an ordered collection of objects. A list can contain duplicate objects. |
| Set | Creates an unordered collection of objects. Objects in a set must be unique. |

Operations

An operation is a feature that represents a behavior that objects can possess. An operation can be thought of as a function: it has a name, an optional set of parameters, and an optional return type. Like properties, operations are applied to each object within the owning type. Consequently, an operation is generally invoked in the context of a specific object.

An operation can have parameters that identify information a caller must provide when invoking the operation. If an operation has no parameters, a caller merely invokes the operation for the desired object. For example, consider the following features:

| Type | Feature | Domain/Return Type |
| --- | --- | --- |
| Employee | birthDate (attribute) | Date |
| | age (operation) | Integer |

As shown, the birthDate attribute has a domain of Date. Age is an operation (with no parameters) whose return type is Integer. The purpose of age is to compute an employee's current age (in years) from his or her birth date. Because the age operation is invoked for a specific employee, it is able to obtain the value of that employee's birthDate attribute, make the necessary computation, and return the appropriate integer without requiring parameters. When an operation has parameters, each parameter has semantics similar to those of properties. Each parameter has a name, a domain type, and a set of options that can be used to affect the behavior of the parameter. The following table shows an example of an operation, defined for the Employee type, that has parameters:

| Operation | Parameter | Parameter Domain | Parameter Options |
| --- | --- | --- | --- |
| setSalary | amount | Real | REQUIRED |
| | authorizedBy | Manager | REQUIRED |
| | effective | Date | DEFAULT today's date |

The setSalary operation has three parameters:

The amount parameter is a Real number (floating-point) that is required. Therefore, the caller must specify a value for this parameter.

The authorizedBy parameter is a Manager object that also is required.

The effective parameter is a date parameter that is not required. However, if the caller does not specify a value for this parameter, the current system date is used by default.

A multi-valued parameter is a set, or collection, of values. Such a parameter is useful when the operation must operate on several objects even though it is invoked in the context of a single object. An operation optionally can return an object when it completes processing, just as a program function can return a value. An operation that returns an object is called typed because it has a return type specified. An operation that does not return an object is called un-typed because it does not have a return type specified. A return type must be one of the types recognized by the repository. An operation can return a set of objects by specifying a collection as its return type.

An operation can be defined for a type and then redefined for each subtype of the original type. This process is called overriding an operation.

When an operation is overridden, a subtype that inherits the operation has a separate method that redefines the functionality of that operation. The technique that the repository uses to choose which method to call for a given operation is called dynamic binding.

Dynamic binding (also called polymorphism) means that the repository chooses the method that is most specific for a given object and operation. The most specific method is the one defined in the lowest subtype of which the object is an instance.

For example, assume setSalary is an operation defined for the Employee type. An employee object can be an instance of the Employee type or one of its subtypes.

If you call the setSalary operation for an object that is an Employee instance, the repository selects the method associated with the setSalary operation defined for the employee type.

If you call the setSalary operation for an object that is a Manager instance, the repository selects the method associated with the setSalary operation as it is redefined for the Manager type. If the Manager type does not redefine the setSalary operation, the repository selects the method associated with the setSalary operation defined for the Employee type as the immediate supertype of the Manager type.

You can define an operation to be called with different sets of parameters. For example, you might define the setSalary operation to be called with only an amount parameter or with both an amount parameter and an effectiveDate parameter.

Each combination of parameters that an operation can accept is called a signature. To define multiple signatures for an operation, you define the operation more than once in the same owner type and use the desired signature for each definition.

Procedures

The operations defined for a model form an interface that can be seen by a caller. Separate from this definition, each operation must be implemented by a module of code called a procedure, which are typically written as separate functions and bound into a set of code libraries. The procedure code library name for each operation is then identified to the repository as part of the definition of the operation.

When a caller invokes an operation, the request is received by the repository, which finds and calls the appropriate procedure. The operation passes to the procedure the appropriate parameters. When a procedure is called, it can then act as a caller and call back into the repository to invoke other operations. Consequently, a procedure can be thought of as a specialized kind of application program. Sometimes the term method is used in lieu of the term procedure.

Objects

An object is an abstract representation of a real—world concept or thing—such as a person, a software package, or an event—that is stored in the repository. In the repository, the state of an object is represented by the values of the properties defined for the type. For example, the state of an integer is its numeric value. The state of a person is its name, birthDate, spouse and so on.

The behavior of an object is the set of functions that the object can perform. In the repository, the behavior of an object is represented by the operations defined for the owner type. A characteristic of object behavior is the ability to return some of its state to a requester. For example, the object person can return its name. For this reason, some object models describe object behavior as the set of messages that an object can receive and respond to. One example of object behavior is the capability an integer has to perform such functions as addition, square root and absolute value.

A Versionable Object is a repository object for which the version service records state changes over time. A Versioned Object is a repository object that represents a particular historical state of a versionable object.

Invention Overview

The generic operation invocation process of the present invention provides the capability to generically call any public operation defined in a model library, thereby providing for dynamic execution of any operation at run-time. The operation that is to be invoked should be defined on any of the persistent types in a model and it could be a static or non-static operation. The parameters of the function that invokes a non-static operation are the operation name and the arguments list for the operation to be invoked. The arguments for the operation that is invoked are packed in a linked list called the UrepArgumentList and passed to the generic invoke operation. This generic invoke operation also has the capability of handling inherited operations and overloaded operations taking into account the normal virtual function rules and multiple inheritance. For example, to invoke the non-static operation the following is entered as a call: Obj.invokeOperation ("opName", argList), where Obj identifies the invoking object, opName identifies the name of the operation being invoked and argList identifies the list of arguments for the invoked operation.

For a static operation, the parameters are the target type in which the operation is defined, target model in which the type is defined and the arguments list for the operation to be invoked. An example of a static operation call is: Obj::invokeOperation ("opName", argList, targetClass, tragetModel), where Obj identifies an instance of a type that defines the static invoke operation, or inherits the operation from a supertype, opName identifies the name of the operation being invoked, argList identifies the list of arguments for the invoked operation, targetClass identifies the type that defines or inherits the invoked operation, and targetModel identifies the model that defines the targetClass. As mentioned earlier, argList is of a type UrepArgumentList, which is basically a linked list.

In order for the process to work, it is assumed that the type names are unique within a model, and that each operation has a name other the name of the operation that uniquely identifies it within a type. Even though a type could have overloaded operations, each operation must have a name, ODL name, that uniquely identifies it within a type in the ODL, (Object Definition Language). In addition to that, some of the generated helper functions are generated as "C" functions so that name mangling by the C++ compiler is prevented. This helps in locating the entry points for these functions in the model library at run time and also makes it compiler independent.

Figure 2A:
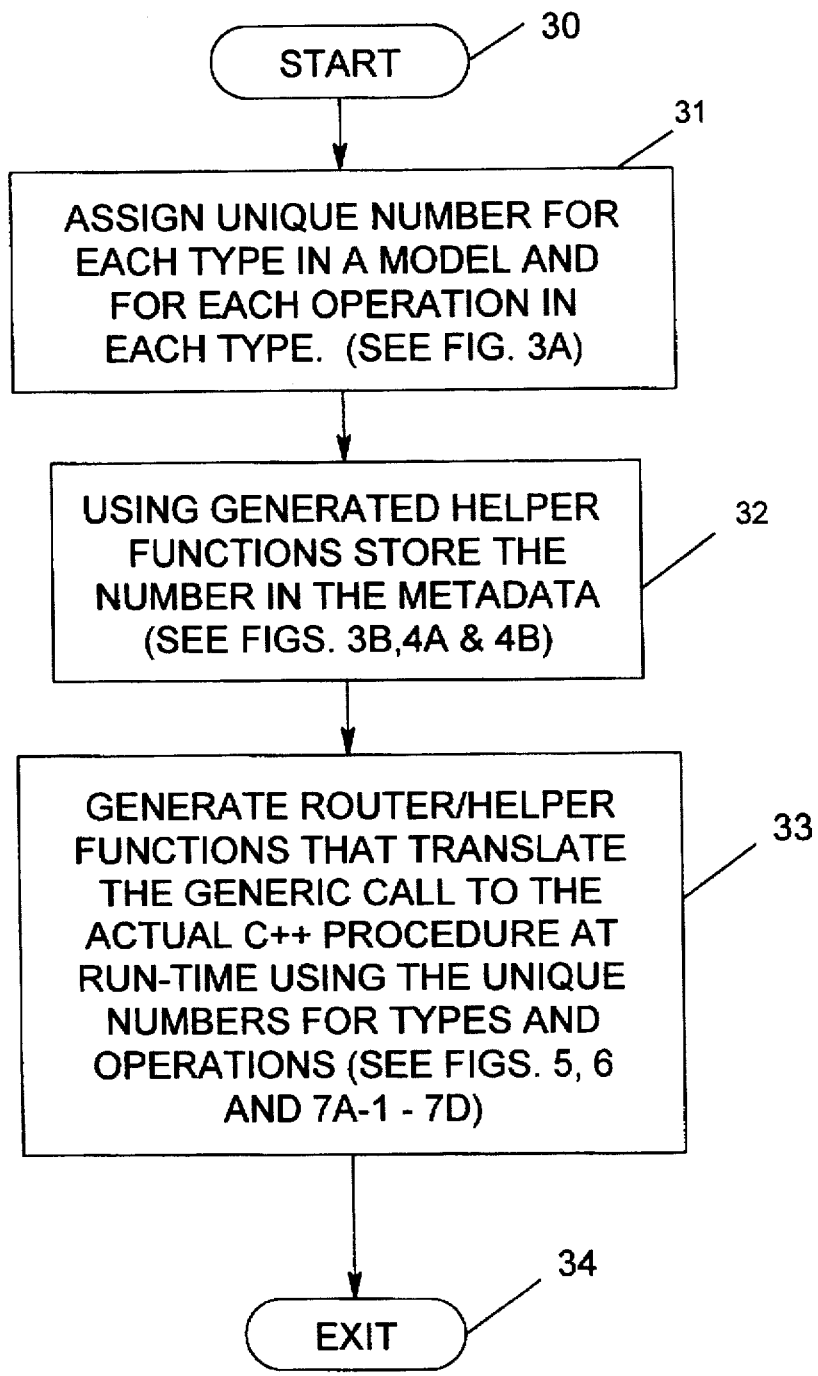
FIG. 2A is a flow chart illustrating the initial preparation steps required prior to performing an invoke operation on objects in a repository. This process is performed only once upon creating the repository.

Referring now to FIG. 2A, a flow chart illustrates the initial preparation steps required prior to performing an invoke operation on objects in a repository. The process begins with a start bubble 30 followed by a process step of assigning unique numbers for each type in a model and for each operation in each type (process block 31). This process step is amplified further hereinafter and illustrated in greater detail in FIG. 3A. Next, a process step of storing in the metadata the numbers assigned in the preceding step by using generated helper functions (process block 32). This process step is amplified further hereinafter and illustrated in greater detail in FIGS. 3B and 4. After this, another process step is performed to generate router/helper functions that translate the generic call to the actual C++ procedure at run-time using the unique numbers for types and operations (process block 33). This process step will be amplified further hereinafter and is illustrated in greater detail in portions of FIGS. 5, 6 and 7A-1 through 7D. Following this step an exit is taken from this process as depicted by an EXIT bubble 34.

Figure 2B:
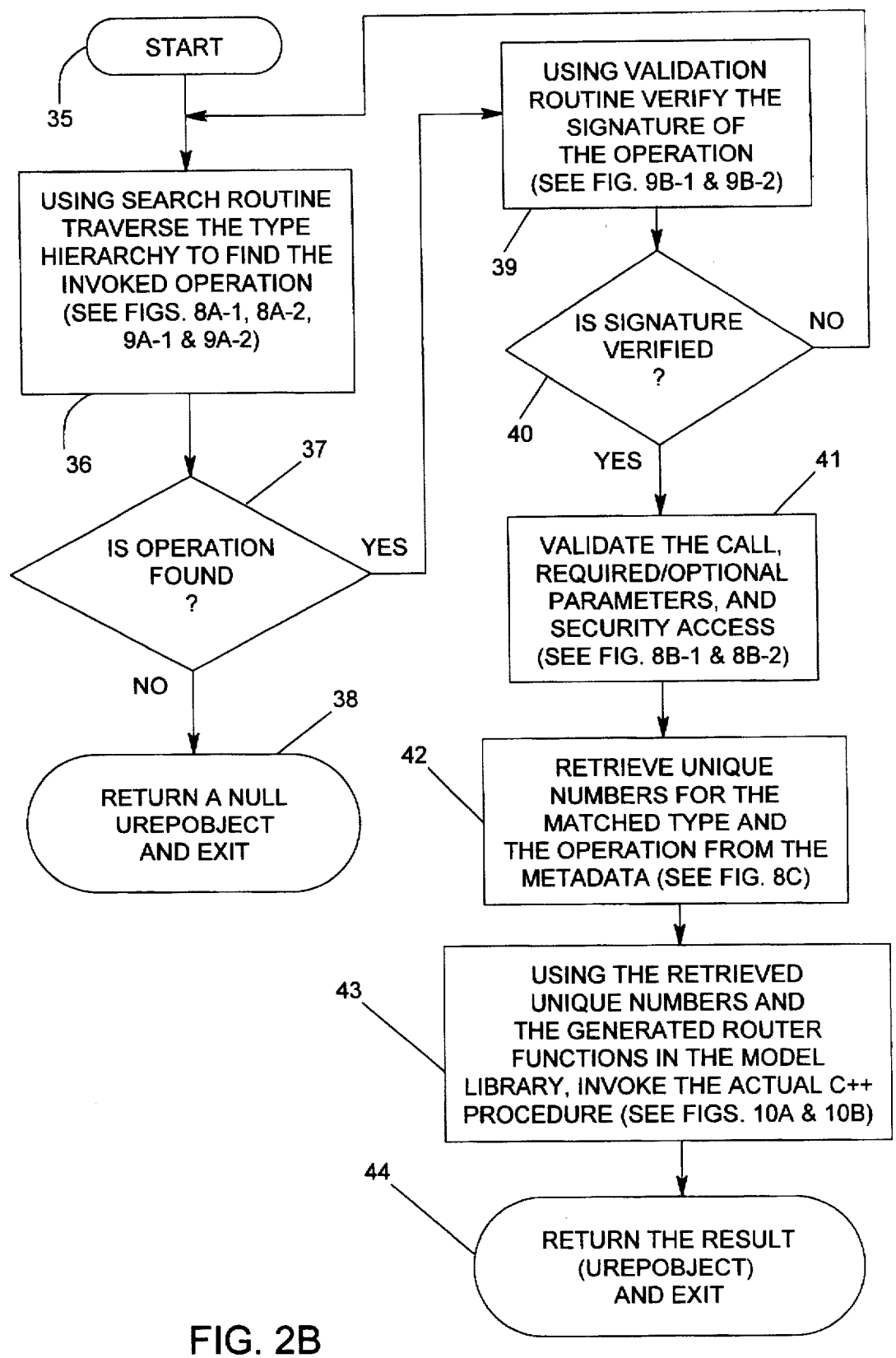
FIG. 2B is a flow chart illustrating the steps of the process of the present invention for invoking operations on objects in a repository.

Referring now to FIG. 2B, a flow chart illustrates the overall process for generically invoking operations on objects in a repository. The process begins with a START bubble 35 followed by a process step of using a search routine to traverse the type hierarchy to find the invoked operation (process block 36). This process step is amplified hereinafter and illustrated in FIGS. 8A-1, 8A-2, 9A-1 and 9A-2.

An inquiry is next made as to whether or not the requested operation is found (diamond 37). If the answer to this inquiry is no then a NULL UrepObject is returned to the caller, and an EXIT is taken from this process as depicted by a bubble 38. On the other hand, if the requested operation is found then a process step of verifying the signature of the operation is performed using the validation routine (process block 39). This process step is amplified further hereinafter and is illustrated in greater detail in FIG. 9B. Another inquiry is made as to whether or not the signature is verified (diamond 40). If the answer to this inquiry is no then a return is made back to the process block 36 to find the operation that matches the invoked operation.

If the signature is verified (diamond 40), then a process step of validating the call, required versus optional for each parameter and security access of the operation, is performed (process block 41). This process step is amplified further hereinafter and illustrated in detail in FIG. 8B. Next, a process step of retrieving the unique numbers for the matched type and the operation from the metadata is performed (process block 42). This process step is amplified further hereinafter and illustrated in greater detail in FIG. 8C. Next, a process step is performed using the retrieved unique numbers and the generated router functions in the model library to invoke the actual C++ procedure (process block 43). This process is amplified further hereinafter and illustrated in greater detail in FIG. 10. Upon successful completion of this process step the result is returned to the caller and an EXIT is taken (bubble 44).

In summary, the method of the present invention is a method for generically invoking operations on objects stored in the repository. The method includes the steps of assigning a first set of unique numbers for each type in a model library and a second set of unique numbers for each operation in each type (block 31); storing the first and second set of unique numbers in metadata of the repository (block 32); generating router and helper functions that translate a generic call to an actual C++ procedure at run time using one of the first and one of the second unique numbers, and compiling and linking the router and helper functions in a library of the model (block 33); using a search routine, traversing type hierarchy to find operation to be invoked (block 36); if the to be invoked operation is found (diamond 37), using a validation routine, verifying signature of the found operation (block 39); if the signature is verified (diamond 40), validating static versus non-static call, required versus optional for each parameter, and security access of the operation (block 41); if the operation is invokable, retrieving the one of the first and the one of the second unique numbers and the operation from the metadata (block 42); using the one of the first and the one of the second unique numbers and the generated router and helper functions in the library of the model, then invoking actual C++ procedure (block 43). The step of using a search routine and each step thereafter is repeated for each call for the invoking operation.

Figure 3A:
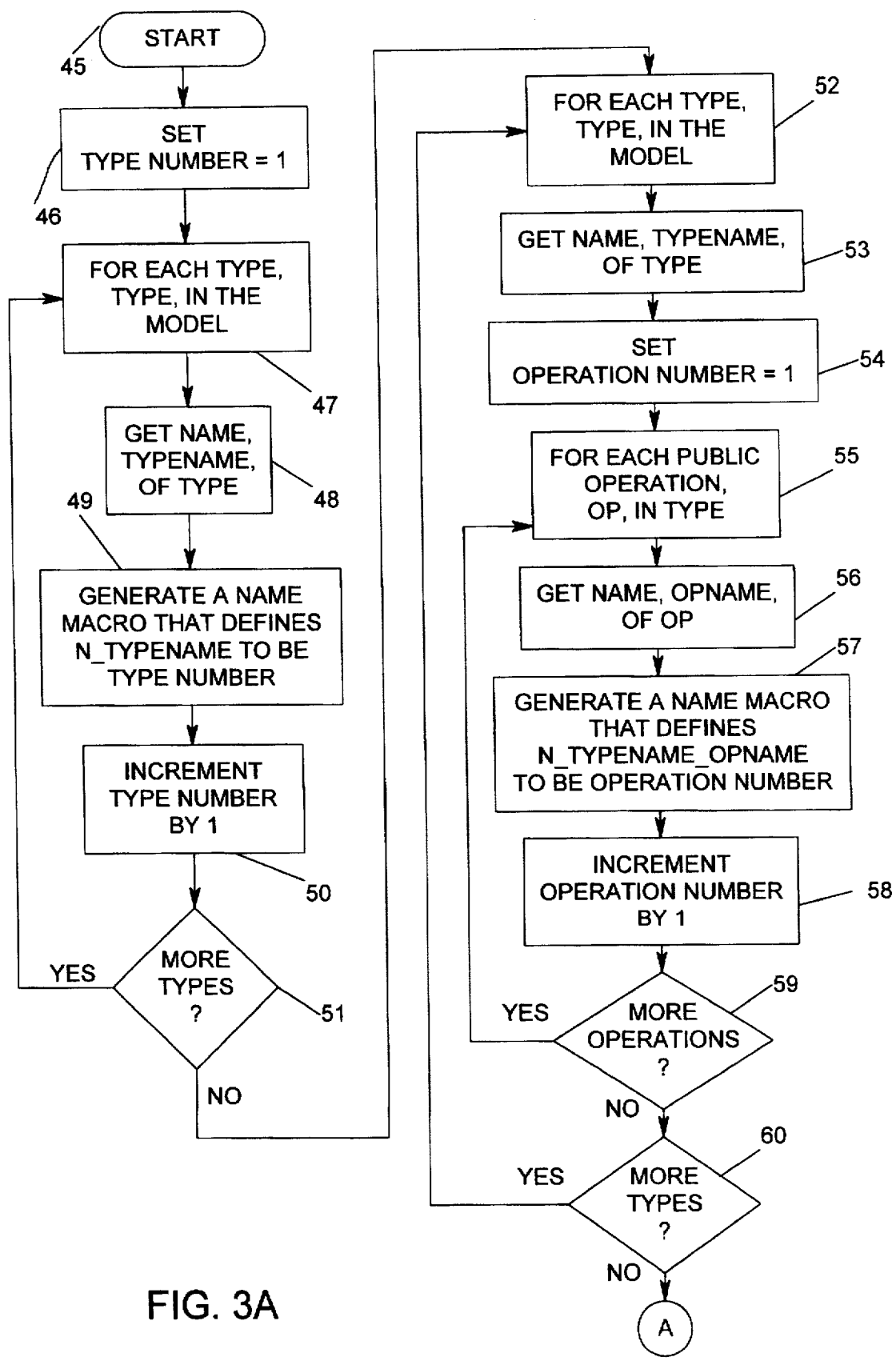
FIG. 3A is a flow chart illustrating the steps of the process for assigning a unique number to each type in the model and to each operation in each type.

Referring now to FIG. 3A, a flow chart is shown that illustrates the process for assigning unique numbers for each type in a model and for each operation in each type. The process begins with a START bubble 45 followed by a process step of setting the type number, typeNumber, equal to one (process block 46). Next, an iteration routine for each type, TYPE, in the model is begun (block 47). A process step of get name, TYPENAME, of TYPE is performed (block 48). Following this step, a name macro is generated that defines N_TYPENAME to be typeNumber, as depicted by a process block 49. The typeNumber is incremented by one (process block 50), followed by an inquiry as to whether or not there are more types (diamond 51). If the answer to this inquiry is yes, then a return is made to the process block for a repeat of the subsequent steps. Thus, by performing the above steps, name macros are generated that assign unique numbers to each type in the model.

If the answer to the inquiry at diamond 51 is no, that is there are no more types, then another iterative routine is initiated for each type, TYPE, in the model (block 52). The next step is to get name, TYPENAME of TYPE (block 53) followed by a process step of setting the operation number, operationNumber, equal to one (block 54 ). Yet another iterative routine is begun for each public operation, OP, in TYPE (block 55), followed by a process step of getting name, OPNAME of OP (block 56). Next, a process step of generating a name macro that defines N_TYPEPNAME_OPNAME to be operationNumber is performed (block 57). Following this step, the operationNumber is incremented by one (block 58). Thus, by performing the above steps, a name macro is generated that assigns a unique number to an operation in a type.

An inquiry is next made as to whether or not there are more operations (diamond 59). If the answer to this inquiry is yes, then a return is made to the process block 55 to repeat the above steps for the next operation. Following this, another inquiry is made as to whether or not there are more types, as depicted by a diamond 60. If there are more types, then a return is made back to the process block 52 to process the next type. Once all the types have been processed, an exit is taken from the no branch of the diamond 60 to the next diagram as denoted by a connector A. Thus, by performing the steps above, name macros are generated for each operation in a type and for all types in a model that assigns unique numbers to each operation.

Figure 3B:
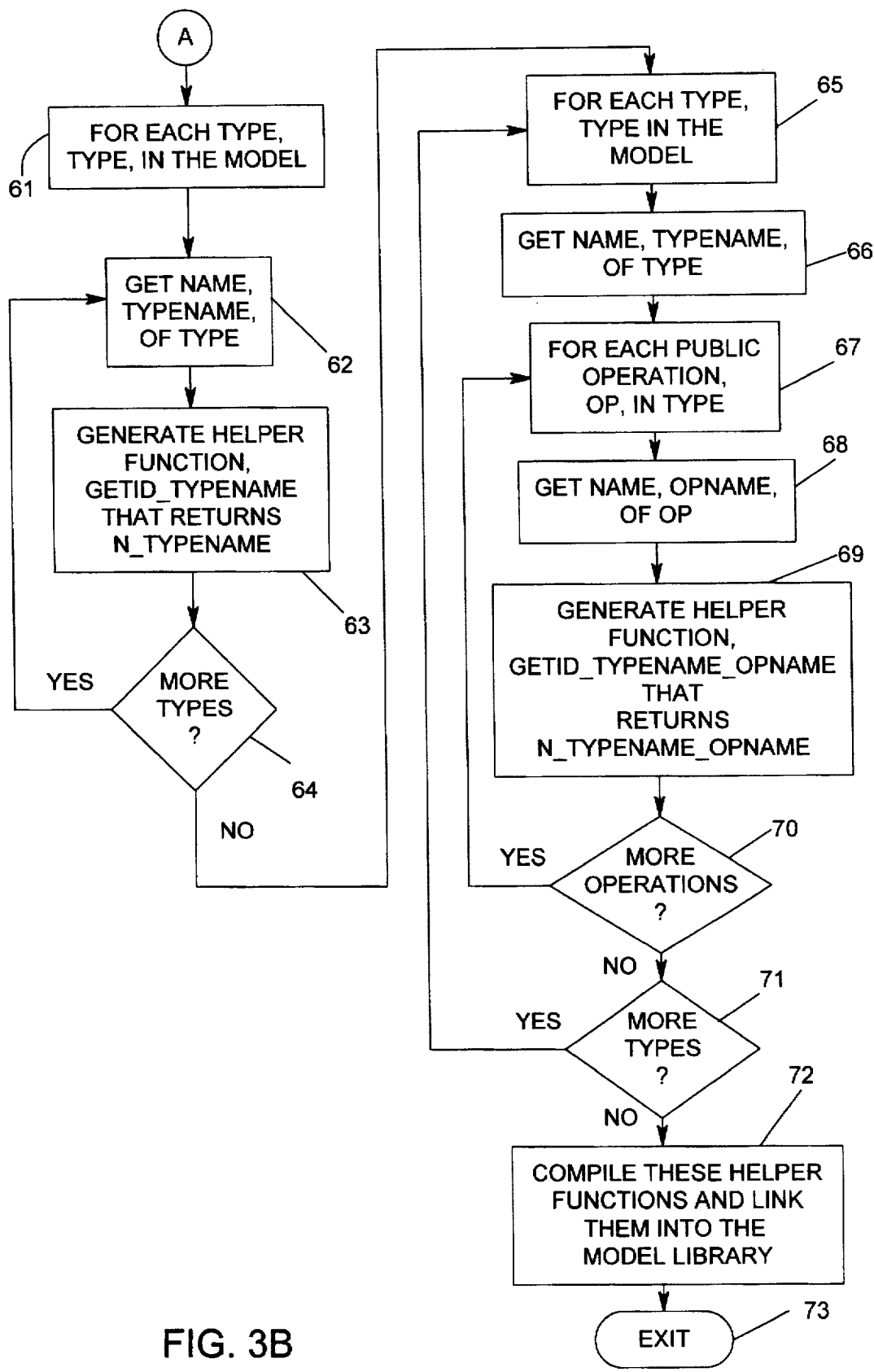
FIG. 3B is a flow chart illustrating the steps of the process for generating helper functions that are used in storing the unique numbers for types and operations in the metadata.

Referring now to FIG. 3B, the process for storing the unique numbers in the metadata by the use of the generated helper functions is shown. Continuing with the description above at the connector A, a recursive routine is begun for each type, TYPE, in the model (block 61). A process step of getting the name, TYPENAME of TYPE, is performed (block 62). Next, a process step of generating a helper function, GetId_TYPENAME that returns N_TYPENAME is performed (block 63). Following this, an inquiry is made as to whether or not there are more types (diamond 64). If the answer to this inquiry is yes, then a return is made to the process block 61 for processing the next Type. Thus, by performing the above repetitive steps, helper functions are generated for each type in a model that returns the unique numbers assigned to that type.

On the other hand, if there are no more types, then another recursive routine is begun for each type, TYPE, in the model (block 65). Next, a process step of getting the TYPENAME of TYPE is performed (block 66). Following this yet another recursive routine is begun for each public operation, OP in TYPE (block 67). Next, a process step of getting the OPNAME of OP is performed (block 68). Following this, a process step of generating a helper function, GetId_TYPENAME_OPNAME that returns N_TYPENAME_OPNAME is performed (block 69). An inquiry is next made as to whether or not there are more operations (diamond 70). If the answer to this inquiry is yes, then a return is made to the process step 67 for processing the next operation. Thus, by performing the above repetitive steps, helper functions are generated for each operation in a type that returns the unique number assigned to that operation.

On the other hand, if there are no more operations then another inquiry is made as to whether or not there are more Types (diamond 71). If the answer to this inquiry is yes then a return is made to the process block 65 for processing the next type. Once all of the types have been processed the helper functions are compiled and linked into the library within the model (block 72). Finally, an exit is taken from this process as denoted by a bubble 73. Thus, by performing the above steps, helper functions are generated, or each unique number associated with that operation. Also, the helper functions generated thus for are compiled and linked into the library for the model.

Figure 4A:
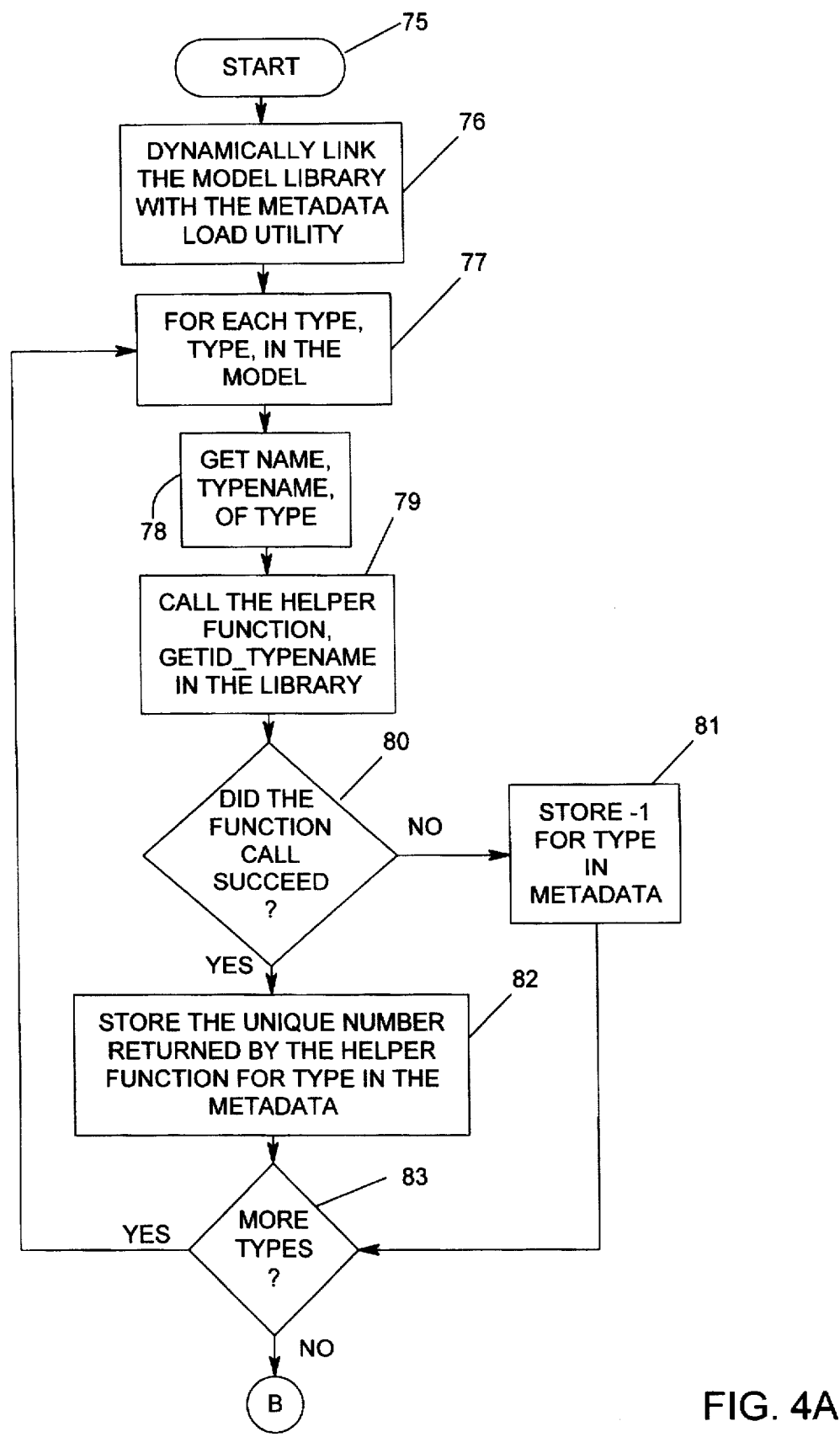
FIGS. 4A and 4B combined form is a flow chart illustrating the steps of the process for storing the unique numbers for types and operations in the metadata, using the generated helper functions.
Figure 4B:
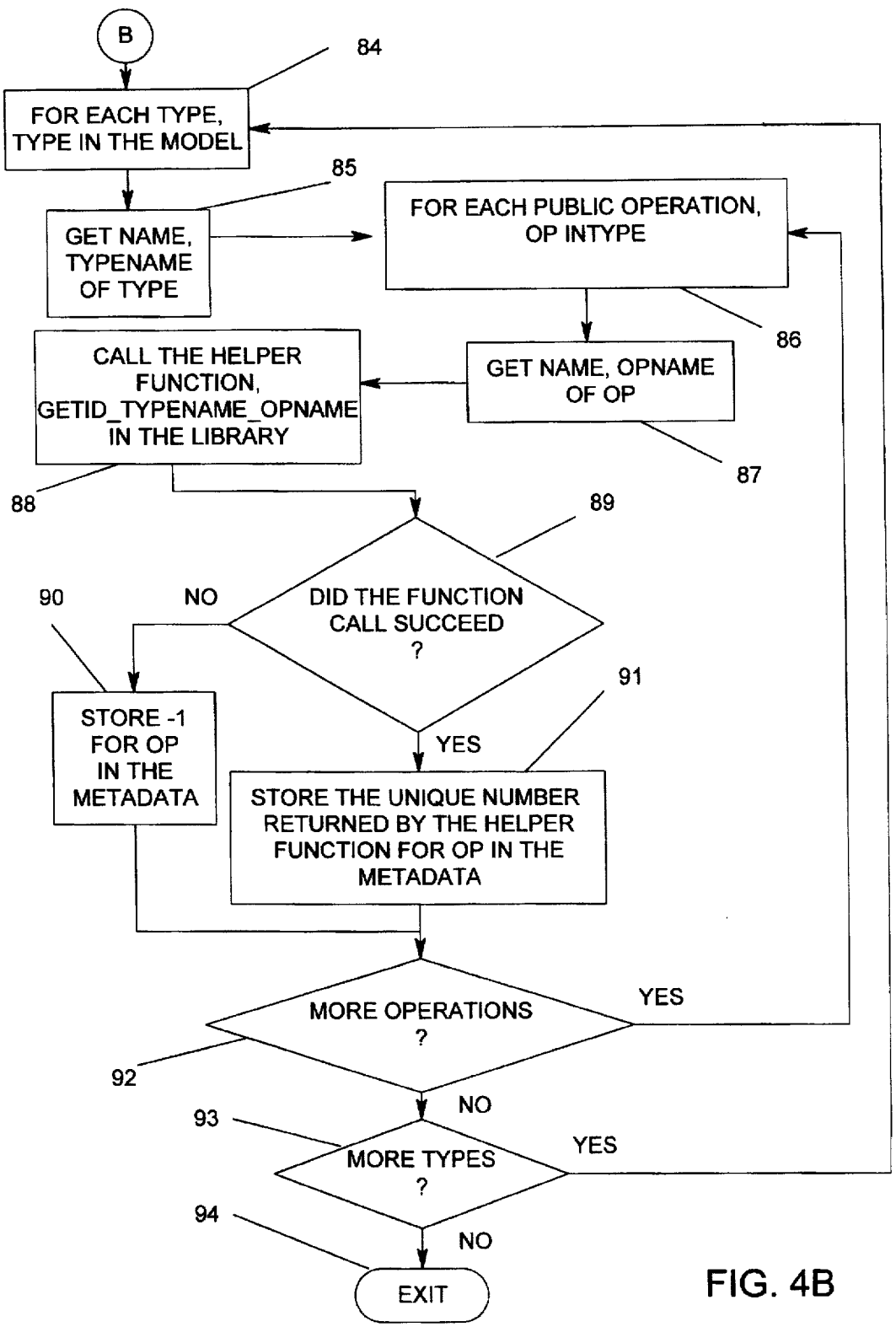

Referring now to FIG. 4A, the first of a two-sheet flow chart illustrates the process steps for storing the unique numbers for types and operations in the metadata and using the generated helper functions. The process begins with a START bubble 75, followed by a process step of dynamically linking the library within the model with the metadata load utility (block 76). This step is performed because the generated helper functions are linked into the model library and the metadata load utility may not already be linked with the model library. Next, an iterative routine is begun for each type, TYPE, in the model (block 77). A process step of getting the name, TYPENAME, of TYPE is performed (block 78). Following this, a process step of calling the helper function, GetId_TYPENAME, in the library is performed (block 79). An inquiry is next made as to whether or not the function call succeeded (diamond 80). If the answer to this inquiry is no, then a minus one (−1) is stored for type in metadata (block 81). By performing the steps above, the unique number associated with a type is obtained by calling the corresponding helper function in the model library.

On the other hand, if the answer to this inquiry is yes, then a process step of storing the unique number returned by the helper function for TYPE in the metadata (block 82). Another inquiry is made as to whether or not there are more Types (diamond 83). If the answer to this inquiry is yes, then a return is made back to the process block 77 for processing the next type. On the other hand, if all types have been processed then a branch is taken to the next sheet of the drawings (FIG. 4B at a connector B) wherein another recursive routine is begun for each TYPE in the model (block 84). A process step of getting name, TYPENAME of TYPE is performed (block 85), followed by the initiation of another recursive routine for each public operation, OP in TYPE (block 86). A process step of getting the name, OPNAME of OP is performed (block 87). Next, a process step of calling the helper function, GetId_TYPENAME_OPNAME, in the model library is performed (block 88).

An inquiry is next made as to whether or not the function call succeeded (diamond 89). If the answer to this inquiry is no, then a process step of storing minus one (−1) for OP in the metadata is performed (block 90). This is done to indicate that a corresponding helper function could not be found in the model library for the operation, op. On the other hand, if the answer to this inquiry is yes, then a process step of storing the unique number returned by the helper function for OP in the metadata is performed (block 91). Yet another inquiry is made as to whether or not there are more operations (diamond 92). If the answer to this inquiry is yes, then a return is made back to the process step 86 for processing of the next operation. On the other hand, if all operations have been performed, then still another inquiry is made as to whether or not there are more types (diamond 93). If the answer to this inquiry is yes, then a return is made back to the process step 84 for process of the next type. On the other hand, if all types have been processed an exit is taken from this process as depicted by an EXIT bubble 94. Thus, by performing the above steps, the unique numbers associated with each type and each public operation in the model are stored in the metadata.

Figure 5:
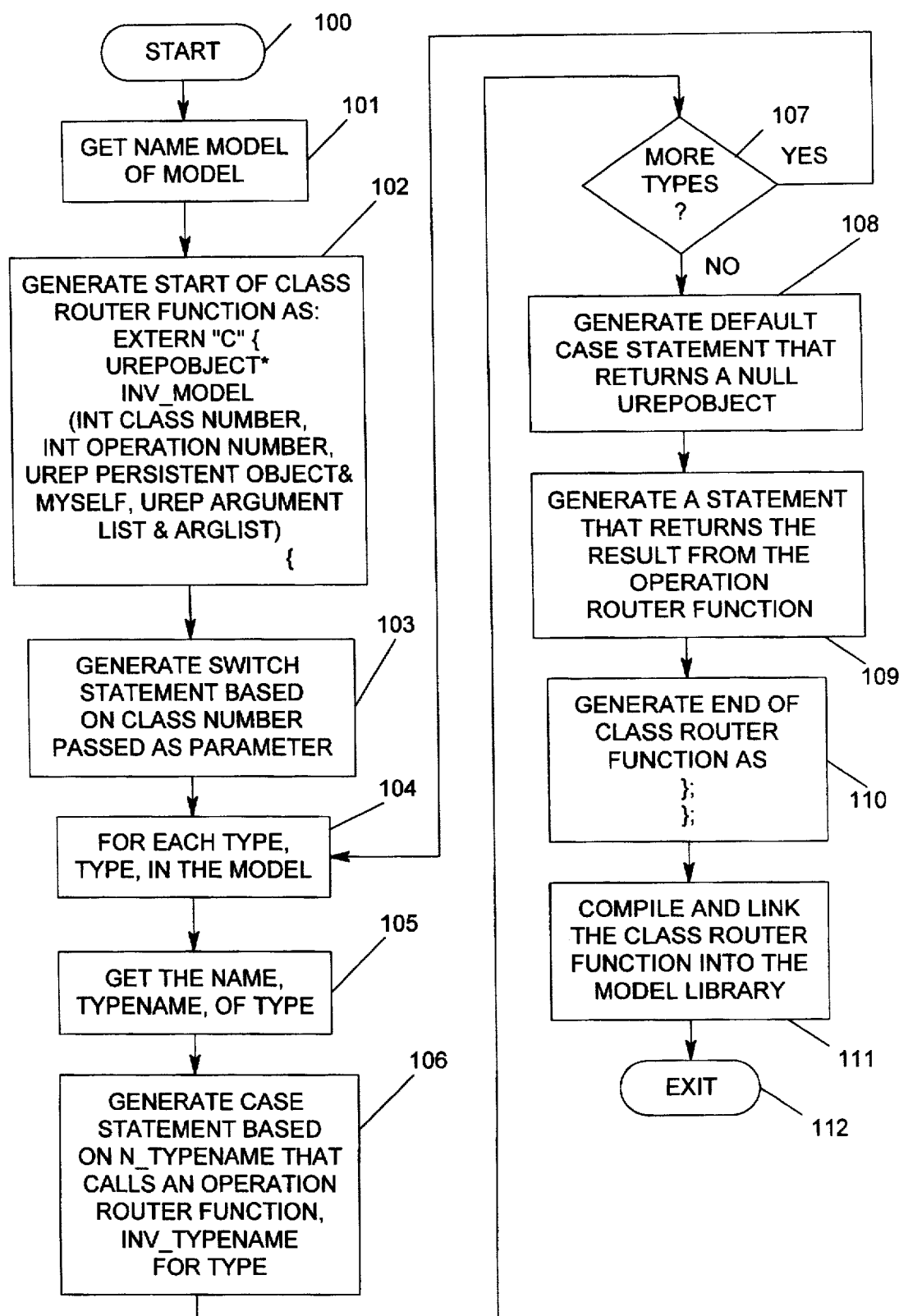
FIG. 5 is a flow chart illustrating the steps of the process for generating class router functions.

Referring now to FIG. 5, a flow chart illustrates the process steps for generating class router functions. The process begins with a START bubble 100 followed by a process step of getting the name, MODEL, of model (process block 101). Next, a process step of generating the start of the class router function is performed (block 102). The class router function is generated as a function for which the parameters are the class number and the operation number for the invoked operation. The return type of the class router function is a pointer to UrepObject and in order to generate it as a "C" function, it is enclosed in an "extern 'C' block". Following this, a process step of generating a switch statement based on the class number, CLASSNUM, passed as a parameter is performed (block 103). This is done so that the corresponding operation router function for a type could be called based on the class number.

An iterative routine is next begun for each type, TYPE in the model (block 104). Following this, a process step of getting the name of TYPE, TYPENAME, is performed (block 105). Another process step is now performed to generate a case statement based on N_TYPENAME that calls an operation router function for TYPE (block 106). An inquiry is next made as to whether or not there are more types (diamond 107). If the answer to this inquiry is yes, then a return is made back to the process block 104 for processing the next type.

On the other hand, if the answer to this inquiry is no, that is there are no more types to be processed, then another process step of generating a default case statement that returns a NULL UrepObject is performed (block 108). Following this, another process step of generating a statement that returns the result from the operation router function is performed (block 109). Thus, by performing the above steps, a class router function is generated that invokes the corresponding operation router function for a type base on the class number passed as a parameter. Next, a process step of generating the end of the class router function is performed (block 110). The class and router functions are next compiled and linked into the model library (block 111). Finally, the process is exited as depicted by an EXIT bubble 112.

Figure 6:
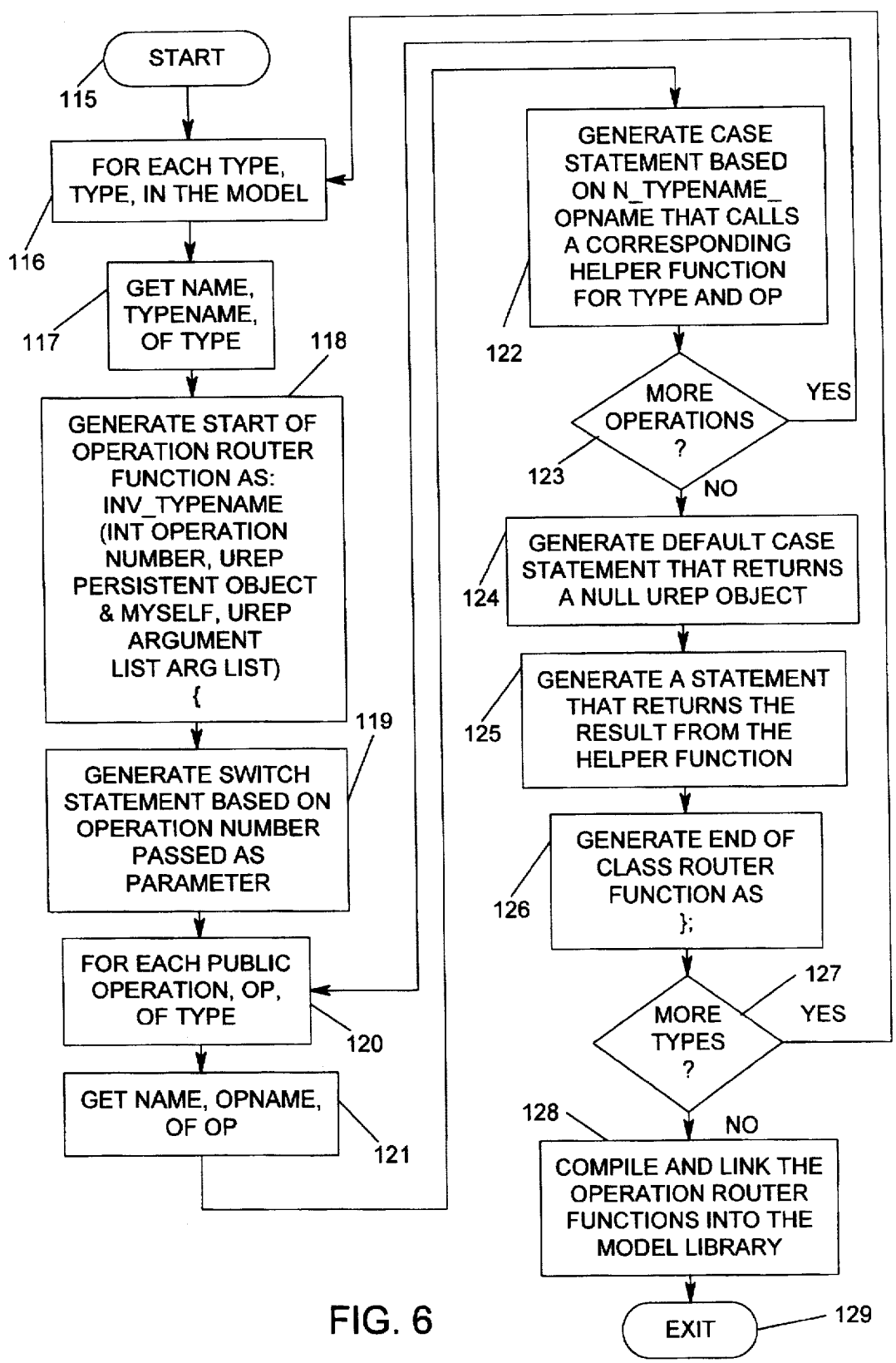
FIG. 6 is a flow chart illustrating the steps of the process for generating operation router functions.

Referring now to FIG. 6, a flow chart illustrates the steps of the process for generating operation router functions. The process begins with a START bubble 115 followed by a process step that begins a recursive routine for each type, TYPE, in the model (block 116). Next, a process step is performed for getting the name, TYPENAME, of TYPE from the type definition (block 117). Following this, a process step of generating the start of the operation router function with the operation number, invoking object and the arguments list as parameters is performed (block 118). Next, another process step of generating a switch statement based on the operation number passed as a parameter is performed (block 119). By performing the above steps, the start of an operation router function for a type is generated.

Another recursive routine is begun for each public operation, OP of TYPE, as depicted by a block 120. The first step following this is to get the name, OPNAME of OP (block 120). Following this, a process step of generating a case statement based on N_TYPENAME_OPNAME that calls a corresponding helper function for TYPE and OP is performed (block 122). By doing this, the corresponding helper function for a given type and operation is invoked based on the operation number passed as a parameter.

An inquiry is next made as to whether or not there are more operations (diamond 123), and if the answer to this inquiry is yes, then a return is made back to the process block 120 for processing the next operation. On the other hand, if there are no more operations then a process step of generating a default case statement that returns a NULL UrepObject is performed (block 124). Next, another process step of generating a statement that returns the result from the helper function is performed (block 125). Following this, a process step of generating the end of the operation router function is performed (block 126). Another inquiry is now made as to whether or not there are more types (diamond 127). If the answer to this inquiry is yes, then a return is made back to the process block 116 for processing the next type. On the other hand, if there are no more types, then the operation router functions are compiled and linked into the model library (block 128). Finally, an exit is taken from this process as depicted by an exit bubble 129. Thus, by performing the above steps, operation router functions are generated for each operation in a type and for all types in a model.

Figures 1, 7A:
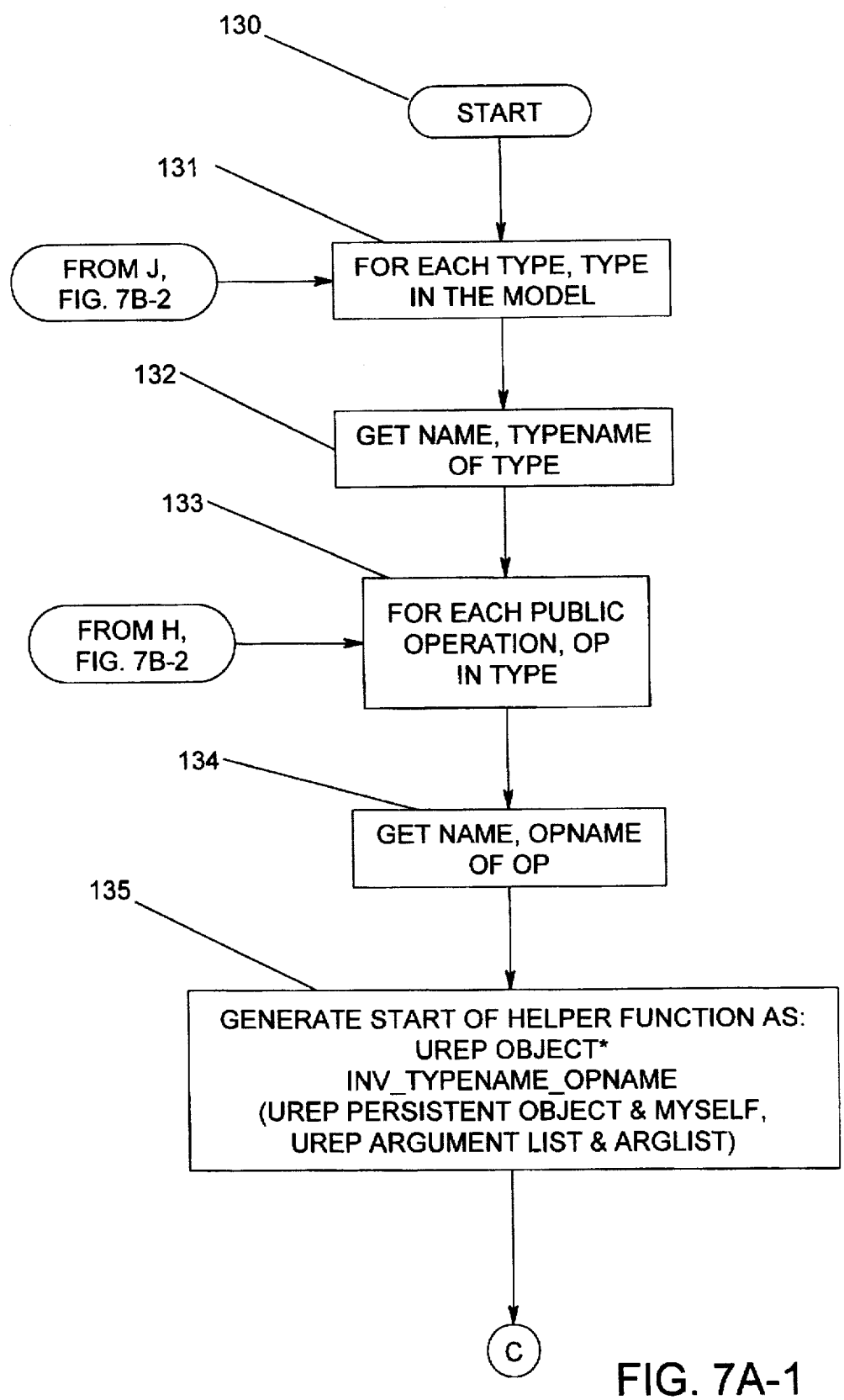
Figures 2, 7A:
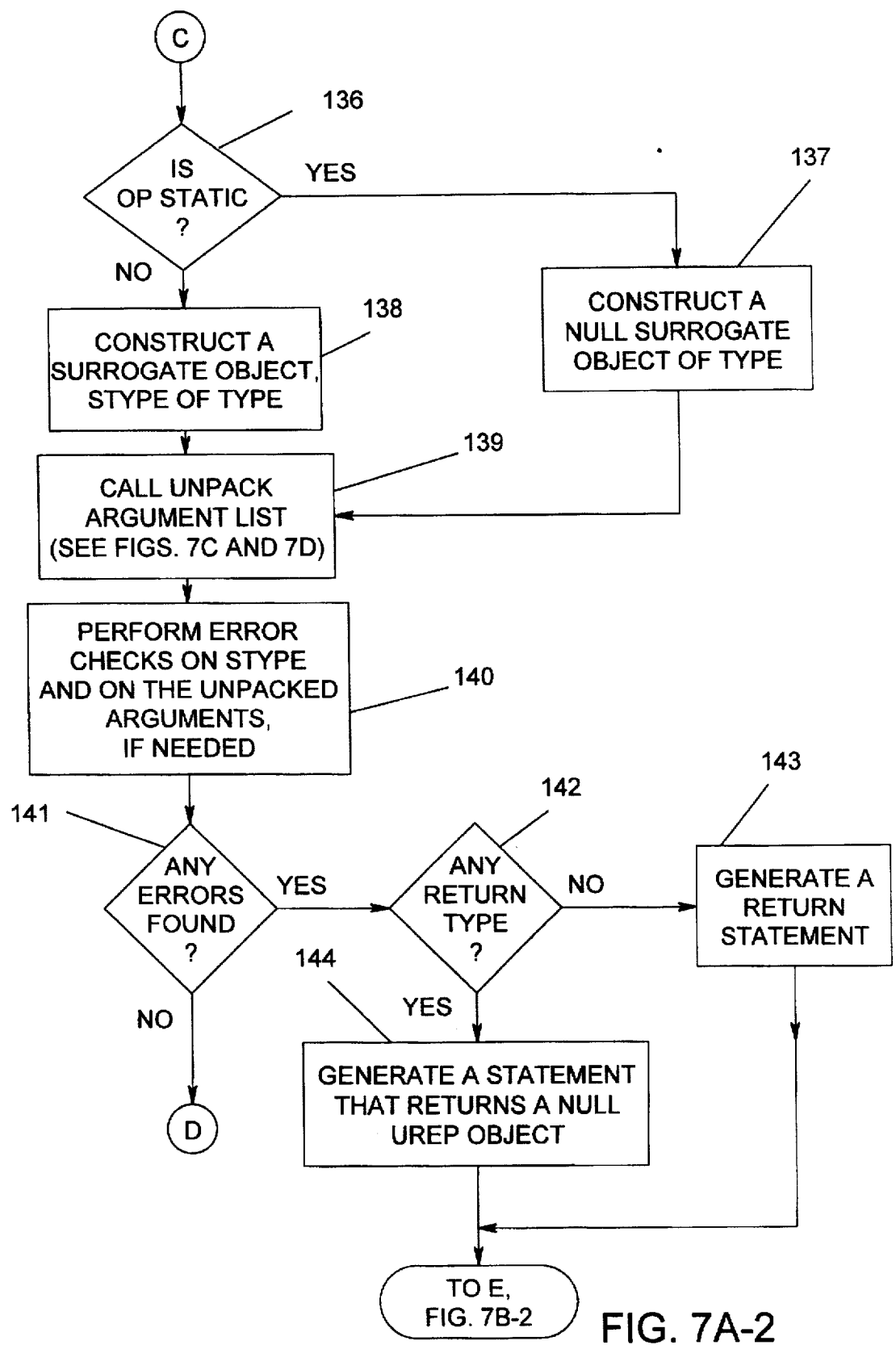

Referring now to FIGS. 7A-1 and 7A-2, the first of a combined flow chart is shown that illustrates the process for generating helper functions that call the actual C++ procedure for the invoke operation using the unique numbers retrieved from the metadata. The process begins with a START bubble 130 followed by the initiation of a recursive routine for each type, TYPE, in the model (block 131). Next, a process step of getting the name, TYPENAME, of TYPE is performed (block 132). Another recursive routine is next begun for each public operation, OP in TYPE, (block 133). Following this, a process step of getting the name, OPNAME, of OP is performed (block 134).

The start of helper functions is generated as depicted by a block 135. (FIGS. 7B-1 and 7B-2) Next, an inquiry is made as to whether or not OP is static (diamond 136). If the answer to this inquiry is yes, then a process step of constructing a NULL surrogate object of TYPE is performed (block 137). On the other hand, if OP is not static, a process step of constructing a surrogate object, STYPE of TYPE is performed (block 138). Following this, the unpackArgumentList procedure is called (block 139). This process step will be amplified further hereinafter in conjunction with the description of FIGS. 7C and 7D. Note that if OP is static, the process of constructing a surrogate object (block 138) is obviated. Thus, by performing the above steps the start of the helper function is generated for a type and operation. In addition, the arguments in the list passed as a parameter are unpacked.

Error checks are next performed on STYPE and on the unpacked arguments, if needed (block 140). An inquiry is next made as to whether or not any errors were found (diamond 141). If no errors were found, then a branch is taken to the remainder of the flow chart in FIGS. 7B-1 and 7B-2 as denoted by a connector D. On the other hand, if an error is found, then another inquiry is made as to whether or not there are any return types (diamond 142). If the answer to this inquiry is no, then a return statement is generated to indicate that the helper function needs to be exited (block 143). On the other hand, if there are no return types, then a process step of generating a statement that returns a NULL UrepObject is performed (block 144). Following this step of the process step depicted by the block 143, a branch is taken to FIG. 7B-2 as depicted by a connector E. By performing the above steps, additional error checks, if any, are performed and corresponding return statements are generated if errors were found on the invoking object or on the arguments required for the invoked operation.

Figures 1, 7B:
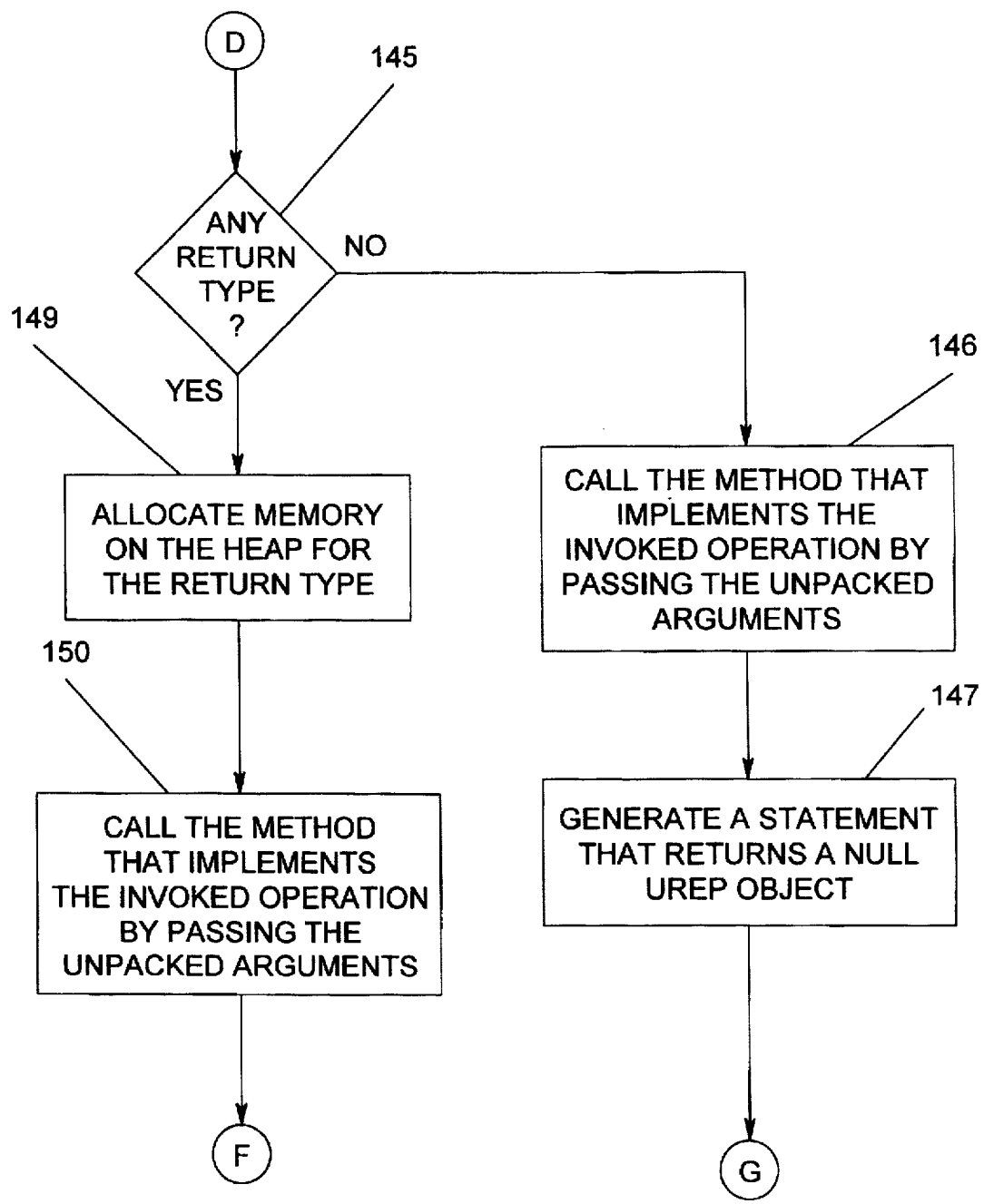
Figures 2, 7B:
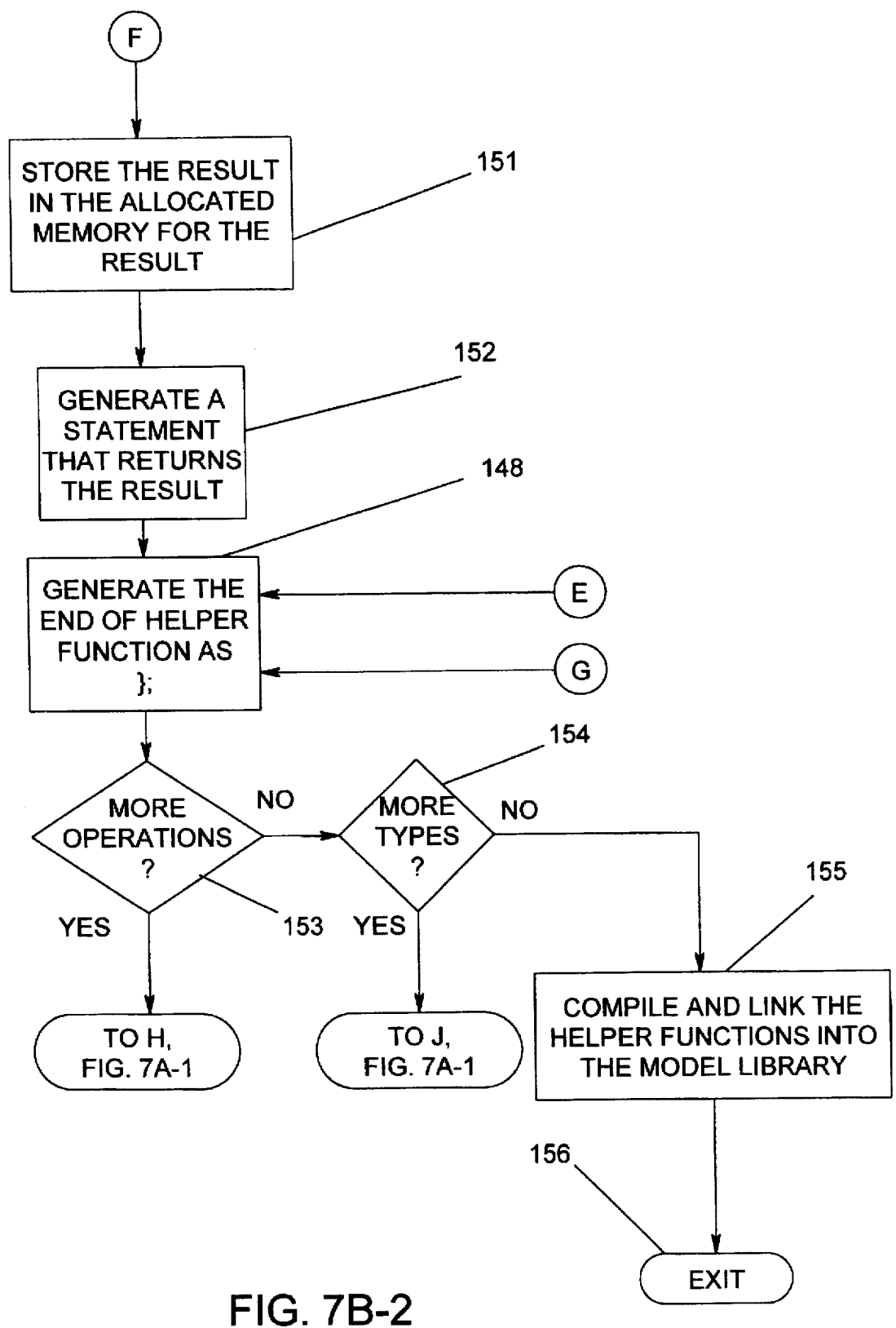

Referring now to FIG. 7B-1, a continuation of the flow chart begun in FIG. 7B-2 is shown. From the connector D, an inquiry is made as to whether or not there are any return types (diamond 145). If the answer to this inquiry is no, then a process step is performed for calling the method that implements the invoked operation by passing the unpacked arguments (block 146). Next, a statement is generated that returns a NULL UrepObject (block 147). Following this, a branch is taken to FIG. 7B-2 at a connector G wherein the end of the helper function is generated (block 148).

On the other hand, if there are return types (yes leg of the diamond 145, FIG. 7B-1), then memory is allocated for the return type (block 149). Next, a method is called that implements the invoked operation by passing the unpacked arguments (block 150). A branch is taken to FIG. 7B-2 at a connector F wherein the result is stored in the memory allocated therefor (block 151). Following this, a statement is generated that returns the result (block 152). The end of the helper function is generated as depicted by the block 148. Thus, by performing the above steps the method that implements the invoked operation is called, and the result, if any, is returned.

Another inquiry is made as to whether or not there are more operations (diamond 153). If the answer to this inquiry is yes, then a return is made back to the process block 133 (FIG. 7A-1) as denoted by a connector H to begin processing for the next operation. On the other hand, if there are no more operations to be processed, then yet another inquiry is made as to whether or not there are more types. If the answer to this inquiry is yes, then a return is made back to block 131 (FIG. 7A-1) as denoted by a connector J to begin processing the next type. On the other hand if there are no more types to be processed, then the helper functions are compiled and linked into the model library (block 155). Once this step has been performed an EXIT is taken form this process as depicted by an exit bubble 156.

Figure 7C:
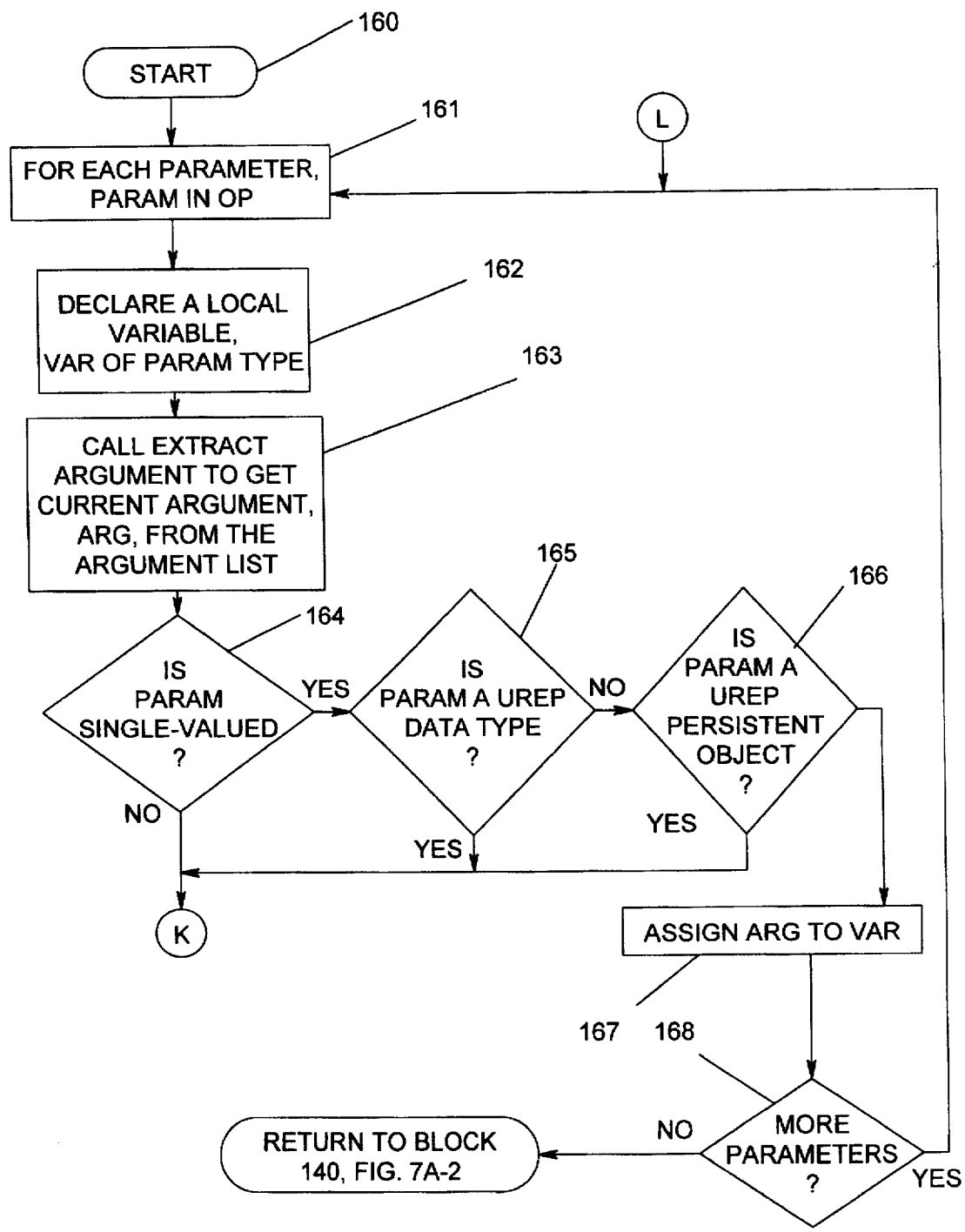

Referring now to FIG. 7C, a flow chart illustrates a part of the process for unpacking the arguments from the argument This is done because arguments for the invoked operation are packed in a linked list. The process begins with a start bubble 160 followed by the beginning of a recursive routine for each parameter, PARAM, in OP (block 161). Next, a local variable is declared VAR of PARAM type (block 162). Following this, the procedure that extracts the arguments frp, the list is called to get the current argument, ARG, from the argument list (block 163). The procedure that extracts the arguments from the list has a "current pointer" that points to the current argument that needs to be extracted. Each time an argument is extracted, the pointer is moved to the next argument in the list. Thus, by calling the above described procedure an argument is extracted from the arguments list.

An inquiry is next made as to whether or not PARAM is single-valued (diamond 164). If the answer to this inquiry is no, then a branch is taken to the flow chart illustrated in FIG. 7D and described hereafter as denoted by a connector K. On the other hand, if the answer to this inquiry is yes, then another inquiry is made as to whether or not PARAM is a Urep DataType (diamond 165). If the answer to this inquiry is yes, then a branch is taken to the chart in FIG. 7D as denoted by the connector K. On the other hand if the answer to this inquiry is no, then yet another inquiry is made as to whether or not PARAM is a Urep PersistentObject (diamond 166). If the answer to this inquiry is yes, then a branch is taken to the flow chart in FIG. 7D as denoted by the connector K. On the other hand, if the answer to this inquiry is no, then ARG is assigned to VAR (block 167). Following this step, still another inquiry is made as to whether or not there are more parameters (diamond 168). If the answer to this inquiry is no, then a return is made (diamond 168) as denoted by a bubble 169. On the other hand if the answer to this inquiry is yes, then a return is made back to the process step 161 for the next parameter. Thus, by performing the above steps arguments for single-valued parameters that are neither a data type nor a persistent type are unpacked from the list and assigned to local variables.

Figure 7D:
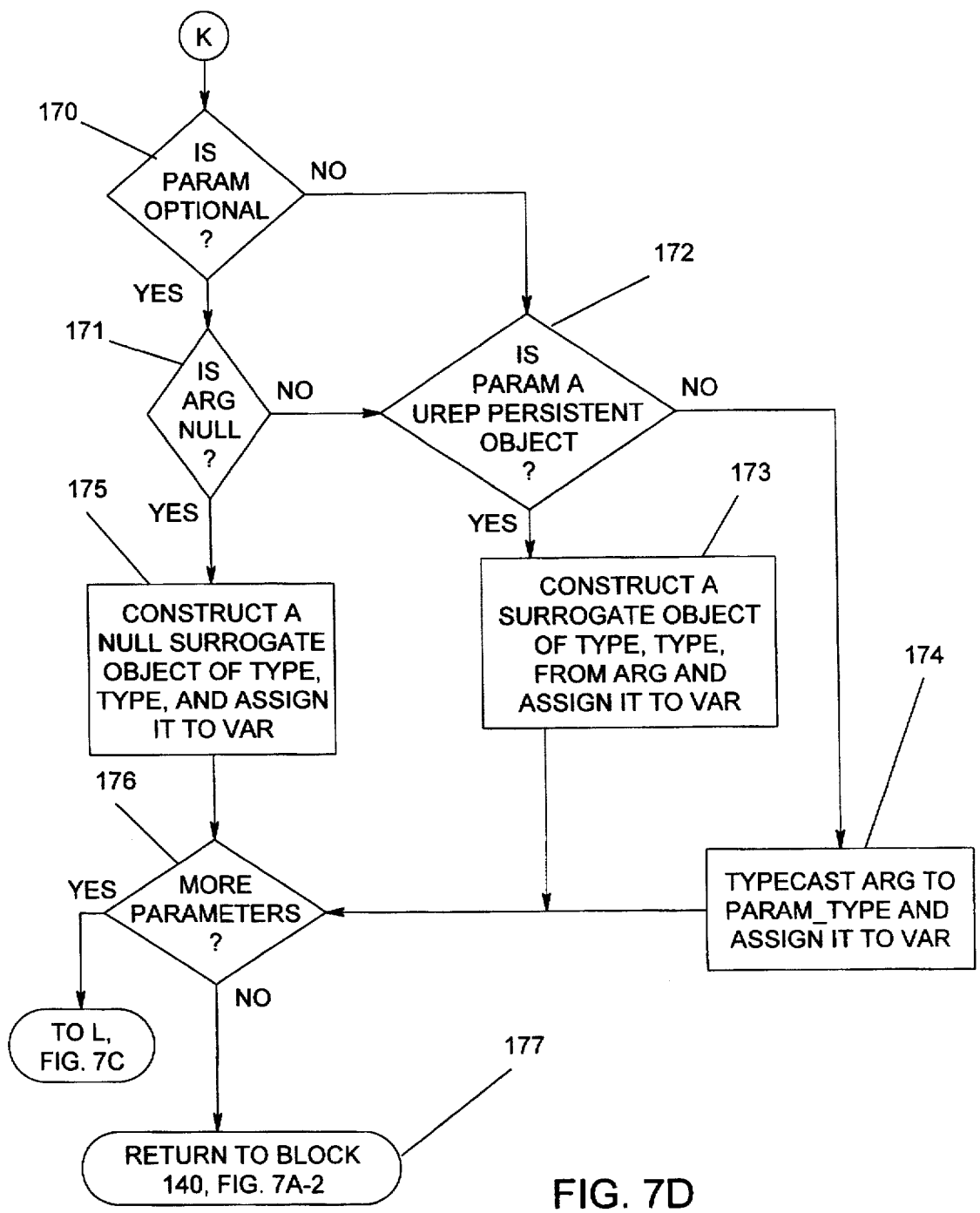

Referring now to FIG. 7D, a continuation of the flow chart of FIG. 7C is illustrated. From the connector K, an inquiry is made as to whether or not PARAM is optional (diamond 170). If the answer to this inquiry is yes, then another inquiry is made as to whether or not ARG is NULL (diamond 171). On the other hand if ARG is not NULL, or if PARAM is not optional (diamond 170), then still another inquiry is made as to whether or not PARAM is a Urep PersistentObject (diamond 172). If the answer to this inquiry is yes, then a surrogated object is constructed of type, TYPE, from ARG and it is assigned to VAR (block 173). On the other hand, if PARAM is not a UrepPersistentObject, then ARG is typecast to PARAM_TYPE and it is assigned to VAR (block 174 ).

Thus, by performing the above steps, arguments for mandatory parameters and optional parameters are unpacked from the argument list and assigned to local variables.

Returning briefly to the diamond, 171, if ARG is NULL, then a NULL surrogate object is constructed of type, TYPE, and it is assigned to VAR (block 175). Following completion of the steps depicted by the blocks 173, 174 or 175 yet another inquiry is made as to whether or not there are more parameters (diamond 176). If the answer to this inquiry is yes, then a branch is taken back to the chart shown in FIG. 7C to begin processing the next parameter as depicted by the connector L. On the other hand, if there are no more parameters, then a return is made back to bubble 140 as depicted by a return bubble 177. Thus, by performing the above steps, NULL arguments in the list for optional parameters are handled.

Figures 1, 8A:
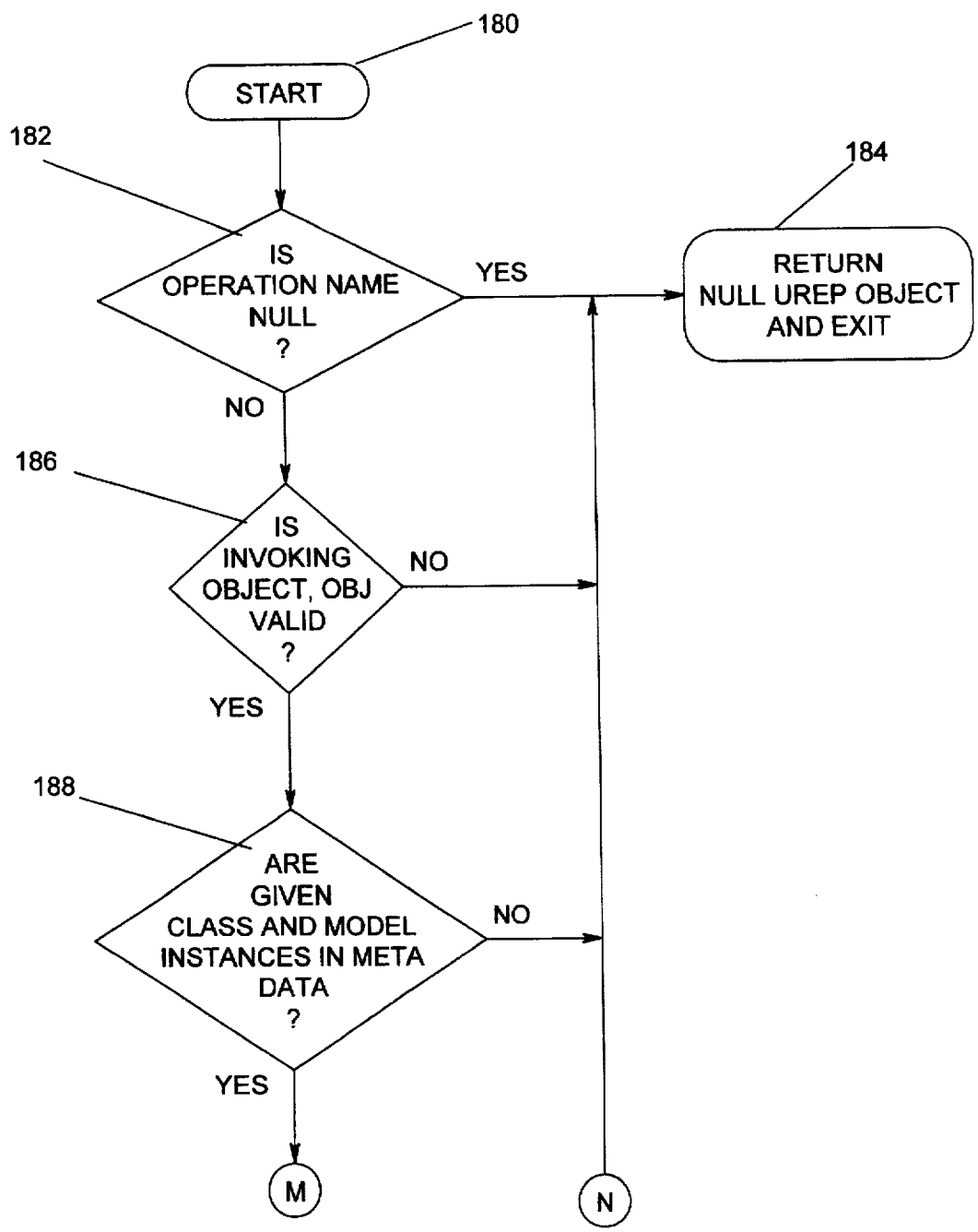
Figures 2, 8A:
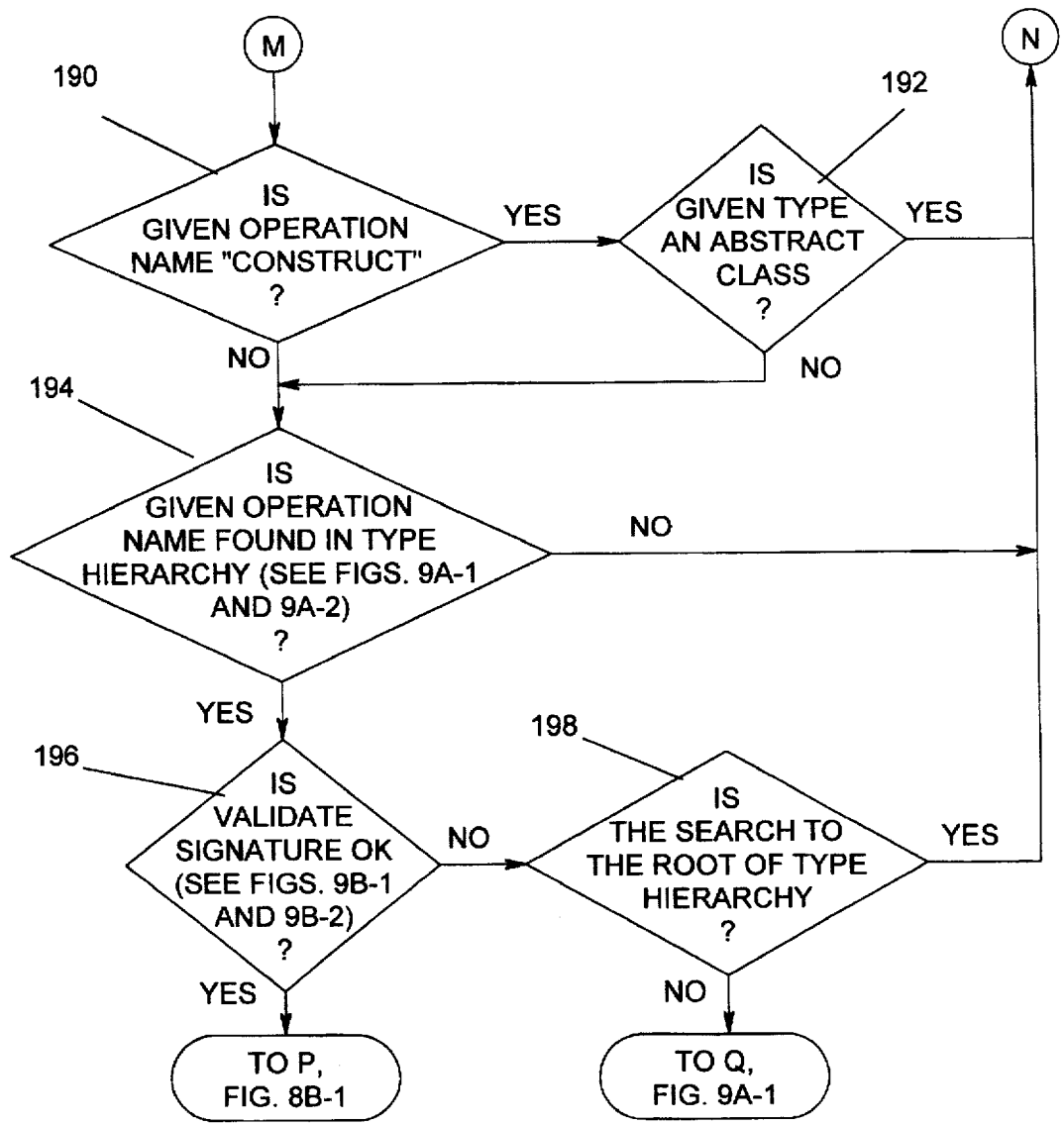

Referring now to FIGS. 8A-1 and 8A-2, a flow chart illustrates that part of the process for searching the metadata for the given model, type and operation. The process begins with a start bubble 180, followed by an inquiry as to whether or not the operationName passed in is NULL (diamond 182). If the answer to this inquiry is yes, then a NULL UrepObject is returned and an EXIT is taken from the process (bubble 184). On the other hand if the answer to this inquiry is no, then another inquiry is made as to whether or not the invoking object, OBJ, is valid (diamond 186). If the answer to this inquiry is no, then a NULL UrepObject is returned and an EXIT is taken from the process (bubble 184). On the other hand, if the answer to this inquiry is yes, then still another inquiry is made as to whether or not the given class and model are an instance in metaClass (diamond 188). This performs the initial validation for parameters and existance of the object passed in for the invoking operation.

If the given class and model are not instances of metaClass, then a NULL UrepObject is returned and an EXIT is taken from the process (bubble 184). On the other hand, if the answer to this inquiry is yes, then a branch is made to FIG. 8AB at a connector M wherein yet another inquiry is made as to whether or not the given operation name is "construct" (diamond 190). The purpose for this inquiry is to prevent constructing an instance for an abstract class, since an abstract class cannot have any instances. If the answer to this inquiry is yes, another inquiry is made as to whether or not the given type is an abstract class (diamond 192). If the answer to this latter inquiry is yes, then a NULL UrepObject is returned and an EXIT is taken from this process (bubble 184 via a connector N to FIG. 8A-1). On the other hand, if the operation name is not "construct" or if it is and the given type is not an abstract class, then another inquiry is made as to whether or not the given operation Name is found in the type hierarchy (diamond 194). The details of this inquiry are amplified hereinafter and illustrated in FIGS. 9AA and 9AB.

If the answer to this inquiry is no then a NULL UrepObject is returned and an EXIT is taken from this process (bubble 184 via a connector N to FIG. 8A-1). If the answer to this inquiry is yes, then another inquiry is made as to whether or not validate signature for this found operation is OK (diamond 196). The details of this inquiry are amplified hereinafter and illustrated in FIG. 9BA. If the answer to this inquiry is no, then yet another inquiry is made as to whether or not the search is to the root of type hierarchy (diamond 198). If the answer to this inquiry is yes, then a NULL UrepObject is returned and an EXIT is taken from this process (bubble 184 via a connector N to FIG. 8A-1). On the other hand, if the answer to this inquiry is no, then a branch is taken to FIG. 9AA as denoted by a connector Q. If the validate signature is OK (diamond 196), then a branch is taken to the next part of this flow chart illustrated on FIG. 8B-1 as denoted by a connector P. This performs the traverse in type hierarchy to find the matched operation and validation of the signature for the found operation.

Figures 1, 8B:
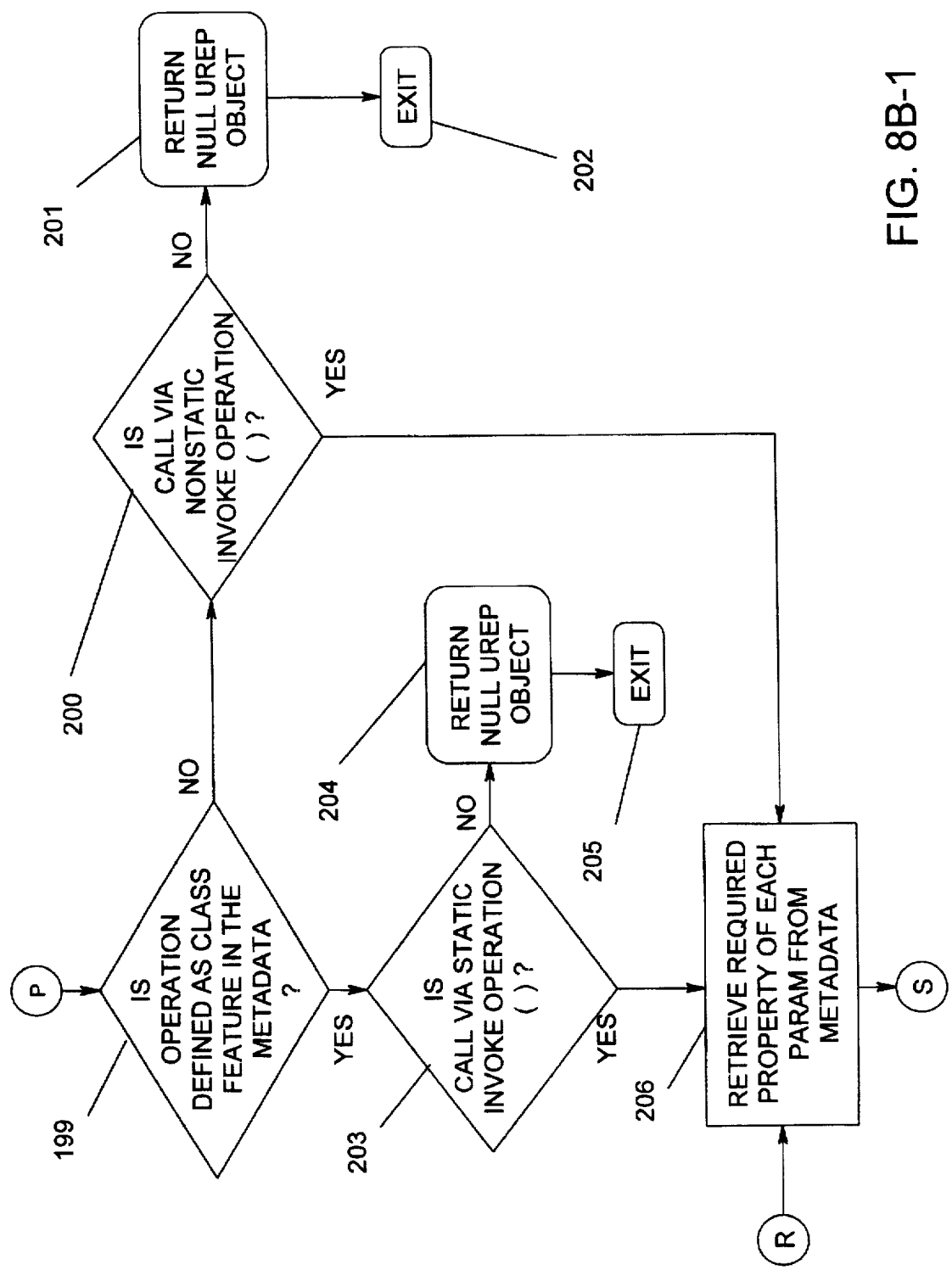

Referring now to FIGS. 8B-1 and 8B-2, a flow chart is shown of the steps of the process for validating the call, required versus optional for each parameter, and security access of the operation. This part of the process begins with the connector P where an inquiry is made as to whether or not the operation is defined as classFeature in the metadata (diamond 199). If the answer to this inquiry is no, then another inquiry is made as to whether or not the operation is invoked using the non-static invokeOperation (diamond 200). If the answer to this inquiry is no, then a NULL UrepObject is returned and an EXIT is taken from this process as depicted by the bubbles 201 and 202. On the other hand, if the operation is defined as a classFeature in the metadata (diamond 199), then yet another inquiry is made as to whether or not the operation is invoked using the static invoke operation (diamond 203). If the answer to this latter inquiry is no, then a NULL UrepObject is returned and an EXIT is taken from this process (bubbles 204 and 205).

On the other hand, if the call is via static invokeOperation or if the answer to the inquiry in the diamond 200 is yes, then the requiredProperty of each parameter is retrieved from the metadata (process block 206). The process illustration continues in FIG. 8B-2 at a connector S wherein, an inquiry is made as to whether or not requiredProperty of this parameter is TRUE (diamond 207). If the answer to this inquiry is yes, then another inquiry is made as to whether or not the argument passed is a NULL object (diamond 208). If the answer to this inquiry is yes, then a NULL UrepObject is returned and an EXIT is taken from this process (bubbles 209 and 210).

On the other hand, if the requiredProperty of this parameter is FALSE, or if the answer to the inquiry in the diamond 208 is no, then an inquiry is made as to whether or not there are more parameters (diamond 211). If the answer to this inquiry is yes then a return is made back to the process step 206 (FIG. 8B-1 at a connector R) to retrieve the requiredProperty for another parameter. On the other hand, if there are no more parameters then a process step is performed of retrieving the accessProperty of this operation (process block 212). Following this, another inquiry is made as to whether or not publicAccess is defined for the operation (diamond 213). If the answer to this inquiry is no, then a NULL UrepObject is returned and an EXIT is taken from this process (bubbles 214 and 215). On the other hand, if the answer to this inquiry is yes, then a branch is taken to the flow chart shown in FIG. 8C as denoted by a bubble 216. This process performs the validation of static versus non-static call, required versus optional parameters, and security access of the operation.

Figure 8C:
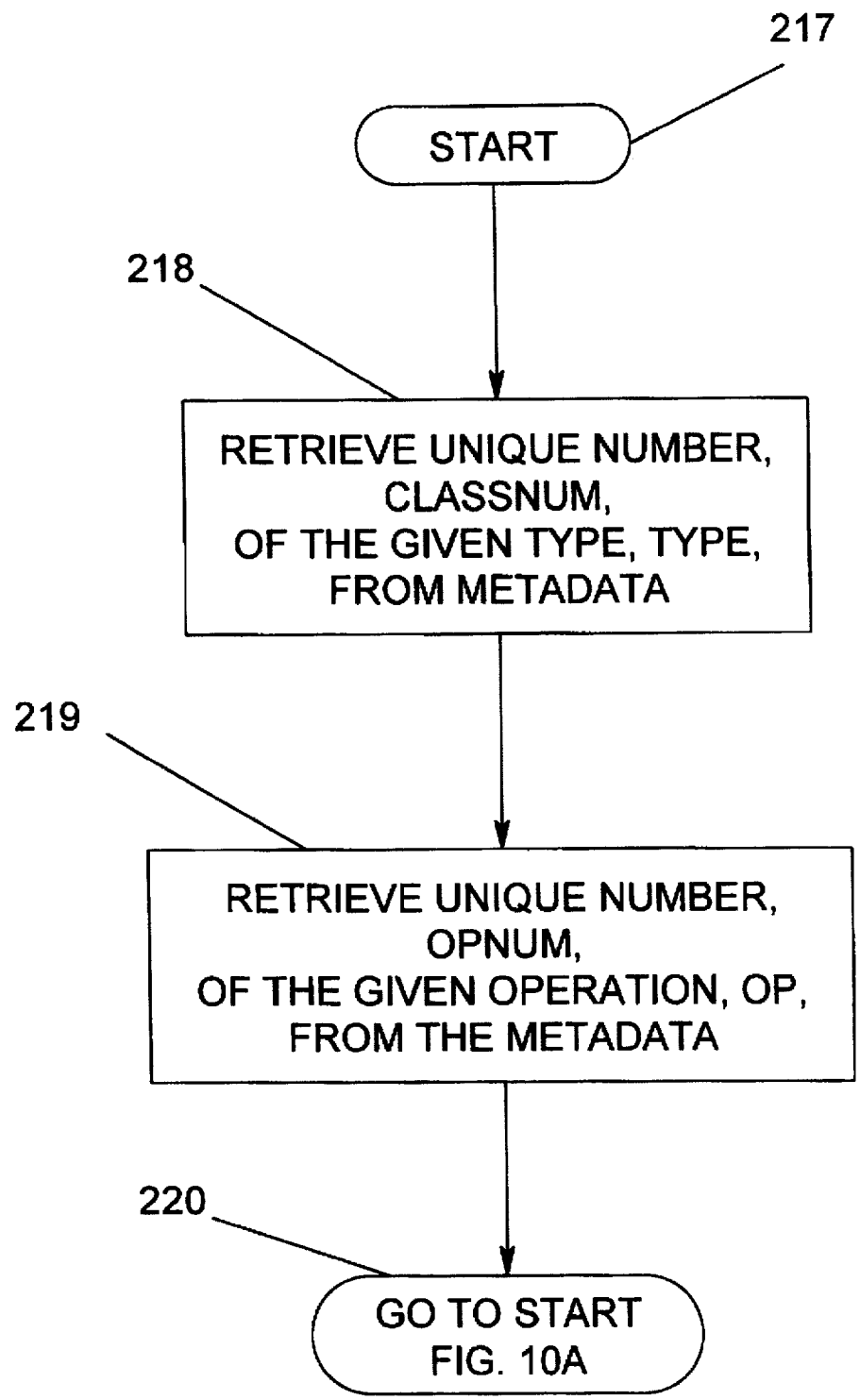
FIG. 8C is a flow chart illustrating the steps of the process for retrieving the uniquely assigned number of this given type and operation from metadata.

Referring now to FIG. 8C, a flow chart is shown that illustrates the steps of the process for retrieving the uniquely assigned number of this given type and operation from metadata. The process begins with a start bubble 217 followed by a process step of retrieving a unique number, CLASSNUM, of the given type, TYPE, from metadata (block 218). Next, a unique number, OPNUM, of the given operation, OP, is retrieved from the metadata (block 219). In other words, these process steps perform a retrieval of the unique number for the given type and operation from the metadata. Finally, a branch is taken to the process illustrated in FIG. 10A and described further hereinafter (bubble 220).

Figures 1, 9A:
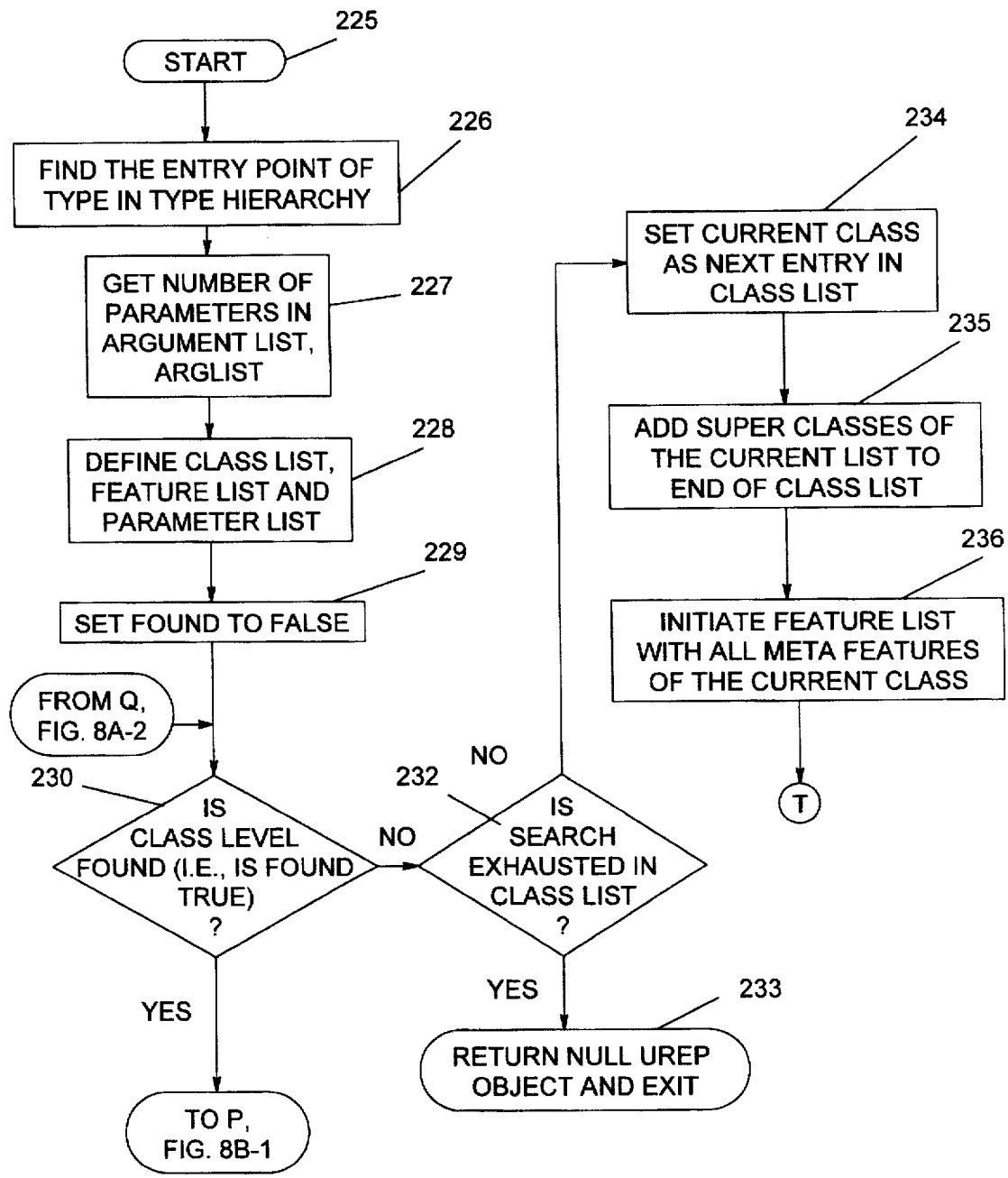
Figures 2, 9A:
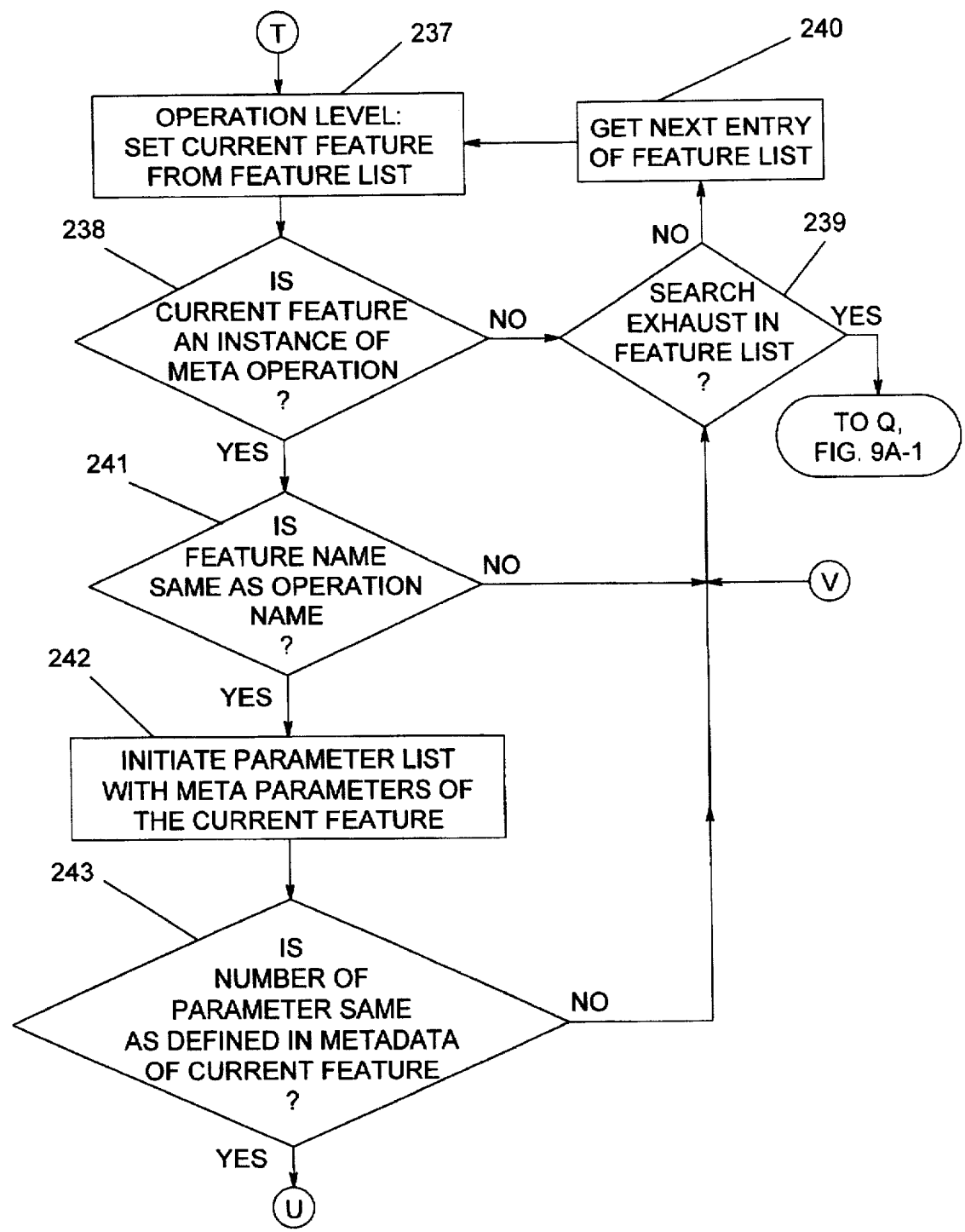

Referring now to FIG. 9A-1 and 9A-2, a flow chart is shown that illustrates the steps of the process for searching the metadata for the given model, type and operation. The process begins with a START bubble 225, followed by a process step of finding the entry point of the type in type hierarchy (block 226). Next, a process step of getting the number of parameters in the argumentList is performed (block 227). After this, another process step of defining classList, featureList and parameterList is performed (block 228). Following this, found is set equal to FALSE (block 229). An inquiry is next made as to whether or not class level is found (diamond 230). If the answer to this inquiry is yes, then a branch is taken to the process shown in FIG. 8B-1 as denoted by the connector P. This process part performs the presetting of environment and temporary storage needed for traversing the type hierarchy.

On the other hand, if class level is not found (found is not equal to TRUE), then another inquiry is made as to whether or not the search is exhausted in the classList (diamond 232). If the answer to this inquiry is yes, then a branch is taken to the exit bubble 184 in FIG. 8A. On the other hand, if the search is not exhausted in the classList, then a process step of setting the currentClass as the next entry in the classList is performed (block 234). Next, another process step of adding superclasses of the currentClass to the end of the classList is performed (block 235). Following this, yet another process step of initiating featureList with all meta features of the currentClass is performed (block 236). The process illustration continues in FIG. 9A-2 at a connector T wherein an operation level process step is next performed to set the currentFeature from the featureList (block 237). As a result of the preceding steps the type hierarchy are dynamically added to the classList, which takes care of the multiple inheritance and ensures only one pass for each type in type hierarchy. Note that the classList is defined as the unique list. Therefore, no duplicate entries could exist in this classList.

An inquiry is next made as to whether or not the currentFeature is an instance of metaOperation (diamond 238). If the answer to this inquiry is no, then another inquiry is made as to whether or not the search is exhausted in the featureList (diamond 239). If the answer to this inquiry is yes then a branch is taken back to the inquiry at diamond 230 (FIG. 9A-1 at the connector Q) as to whether or not class level is found. On the other hand, if the answer to this inquiry is no, then the next entry of the featureList is obtained (block 240). Once this process step has been performed a return is made in the process at the block 237 to set the currentFeature from the featureList. Then the inquiry is repeated at diamond 238, and if the currentFeature is an instance of metaOperation, then another inquiry is made as to whether or not featureName is the same as the operation name (diamond 241). The foregoing explains the searching in the operation level in the class. The operationName is found matched when the following two conditions are satisfied. One is the given operation name is the same as that defined in the metadata, and the other is the opertion is an instance of the metaOperation in the model.

Figures 1, 9B:
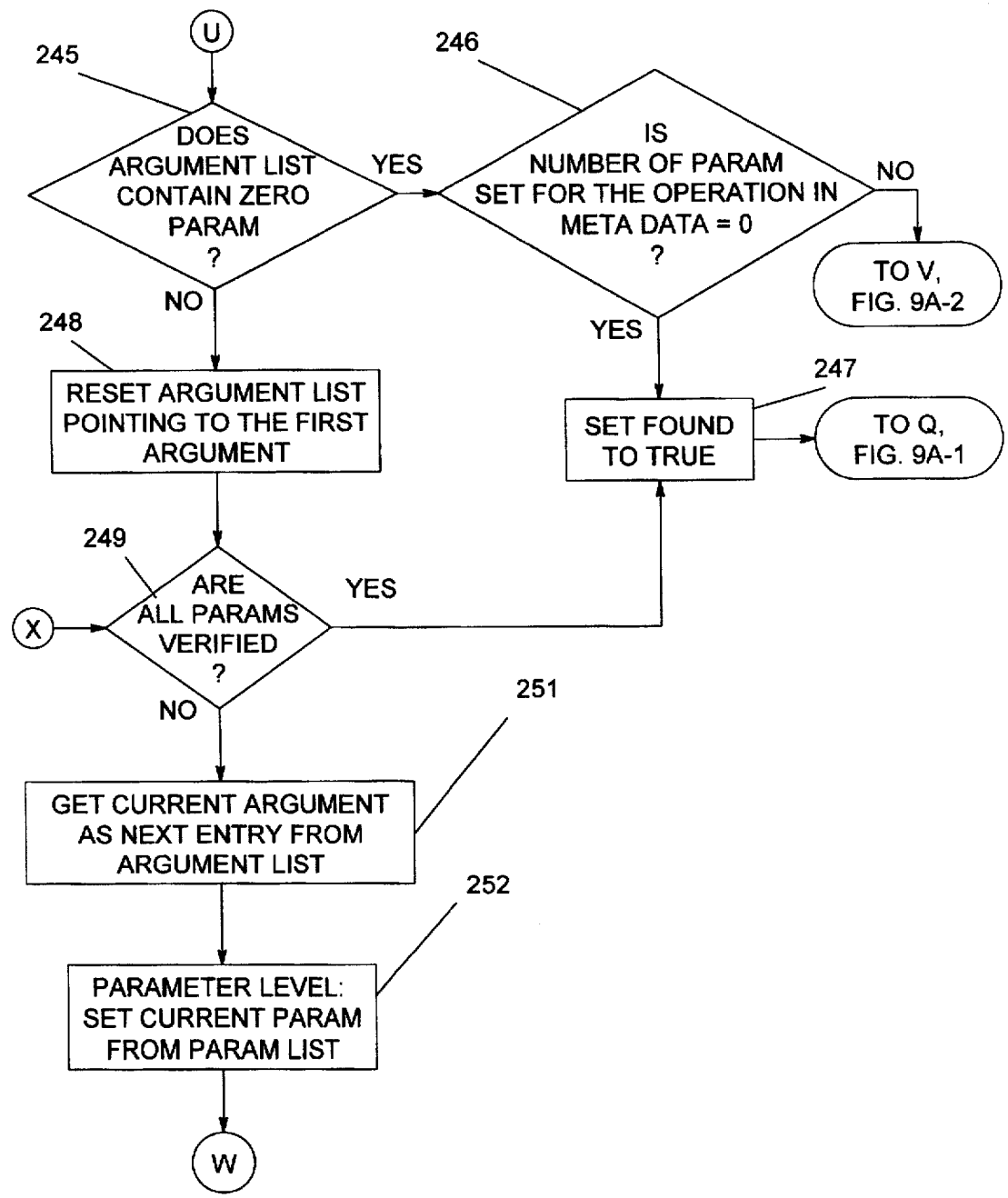
Figures 2, 9B:
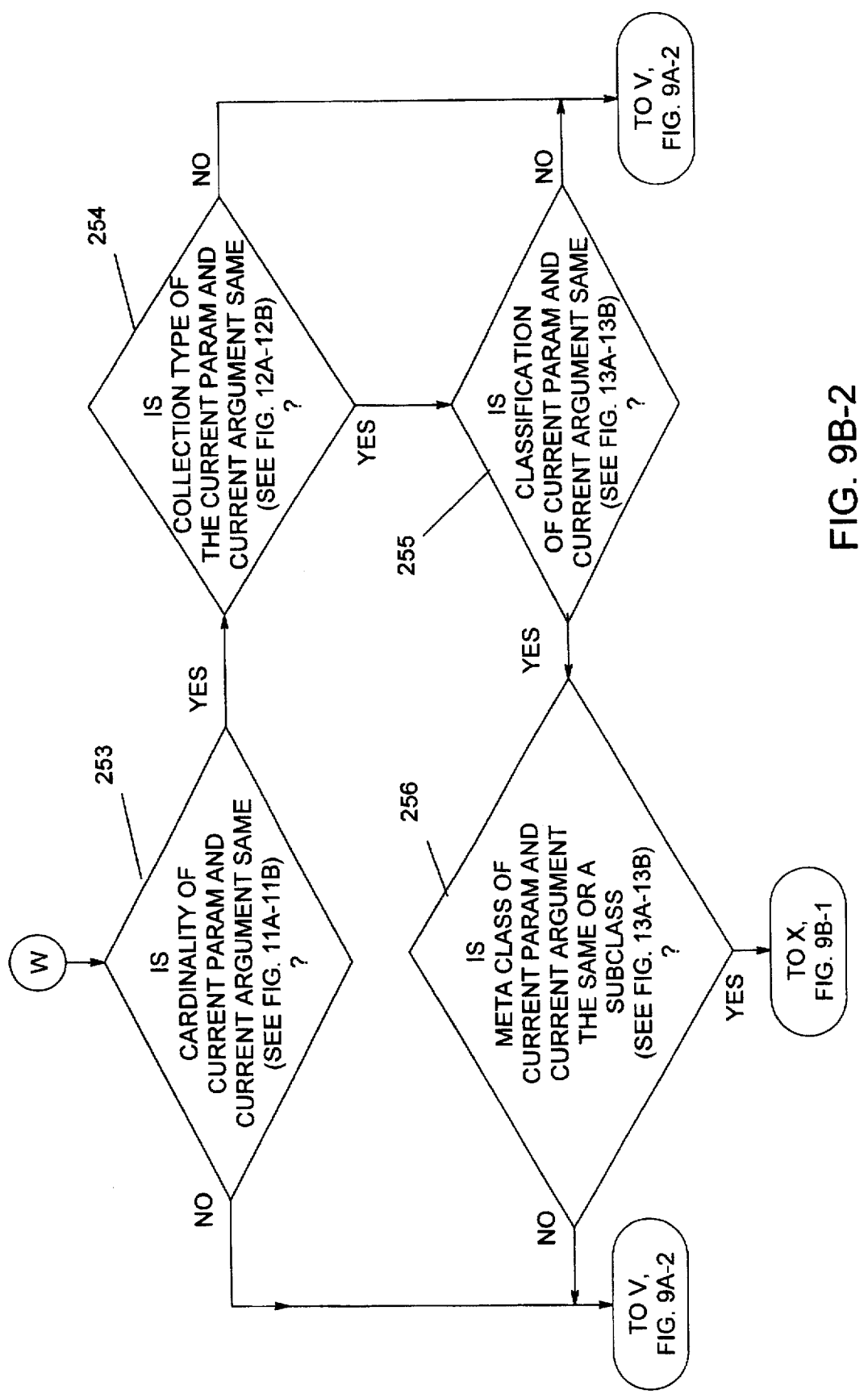

If the featureName is not the same as the operation name then a return is made to the inquiry of whether or not the search is exhausted in the featureList (diamond 239). On the other hand, if the featureName is the same as the operation name, then a process step of initiating the paramList with metaParameters of the currentFeature is performed (block 242). Next, another inquiry is made as to whether or not the number of parameters is the same as defined in the metadata of currentFeature (diamond 243). If the answer to this inquiry is no, then a return is made to the diamond 239 and the process is repeated. On the other hand, if the answer to this inquiry is yes, then a branch is taken to the next part of this flow chart as illustrated in FIGS. 9B-1 and 9B-2 as denoted by a connector U. This section and the section shown in FIGS. 9B-1 and 9B-2 explains how the ovreloaded operation is taken into account for the invoking operation.

Referring now to FIGS. 9B-1 and 9B-2, this portion of the flow chart illustrates the steps of the process for verifying the signature of the operation. From the connector K, an inquiry is made as to whether or not the argumentList contains any parameters (diamond 245). If the answer to this inquiry is yes then another inquiry is made as to whether or not the number of parameter set for the operation in metadata is equal to zero (diamond 246). If the answer to this inquiry is yes, then found is set to TRUE (block 247) and a branch is taken back to the diamond 230 in FIG. 9A-1 as denoted by the connector Q. On the other hand, if the answer to the inquiry in the diamond 246 is no, then a branch is taken back to the diamond 239 in FIG. 9A-1 as denoted by a connector V. This explains where the given operation name is found in metadata and if both the number of parameters passed in for the given operation and that defined in metadata are zero, then the operation is invoked. Otherwise, this is an ovreloaded operation and not the one to be invoked.

If the argumentList is not empty (diamond 245), then a process step of resetting the argumentList pointing to the first argument is performed (block 248). Following this, an inquiry is made as to whether or not all parameters are verified (diamond 249). If the answer to this inquiry is yes, then found is set equal to TRUE (bubble 250) and a branch is taken back to the diamond 230 in FIG. 9A. On the other hand, if the answer to this inquiry is no, then a process step of getting the currentArgument as the next entry from the argumentList is performed (block 251). After this, a parameter level process step is performed for setting the current parameter from paramList (block 252). After finding the matched operation name and matched number of parameters for the operation, this part of the process sets the environment and temporary storage for validating the signature for each parameter the operation found. The process illustration continues in FIG. 9B-1 at a connector W.

With reference to FIG. 9B-2 at the connector W, an inquiry is next made as to whether or not the cardinality of the currentParam and the currentArgument is the same (diamond 253). This inquiry is amplified further hereinafter and illustrated in detail in FIGS. 11A and 11B. If the answer to this inquiry is no, then a branch is taken back to the diamond 239 in FIG. 9A-2 as denoted by the connector V. On the other hand, if the answer to this inquiry is yes, then another inquiry is made as to whether or not the collectionType of the currentParam and the currentArgument are the same (diamond 254). This inquiry is amplified further hereinafter and illustrated in detail in FIGS. 12A and 12B. If the answer to this inquiry is no, then a branch is taken to the diamond 239 of FIG. 9A-2 as denoted by the connector V. This part of the process verifies the cardinality and the collectionType of the currentParam and the currentArgument, and ensures that they are consistent. If they are inconsistent, then the signature validation for this parameter fails. This is not the operation to be invoked and the process continues searching for the next matched operation.

On the other hand, if the answer to this inquiry is yes, then yet another inquiry is made as to whether or not classification of the currentParam and the currentArgument is the same (diamond 255) This inquiry is amplified further hereinafter and illustrated in detail in FIGS. 13A and 13B. If the answer to this inquiry is no then a branch is taken to the diamond 239 of FIG. 9AB as denoted by the connector V. On the other hand if the answer to this inquiry is yes, then still another inquiry as to whether or not the metaClass of the currentParam and the currentArgument is the same or a subclass (diamond 256). This inquiry is amplified further hereinafter and is illustrated in detail in FIGS. 13A and 13B. If the answer to this inquiry is no then a branch is taken to the same diamond 239 in FIG. 9A-2 as denoted by the connector V. On the other hand, if the answer to this inquiry is yes, then a return is made back to the inquiry at diamond 249 (FIG. 9B-1, at a connector X) as to whether or not all parameters verified, whereupon the process is repeated for the next parameter to be verified. This part of the process verifies the classification of the currentParam and the currentArgument, and also verifies the metaClass of whether the currentArgument is the same as or a subclass of metaclass of the currentParam. If the validation fails, this is not the operation to be invoked and the process continues searching for the next matched operation.

Figure 10A:
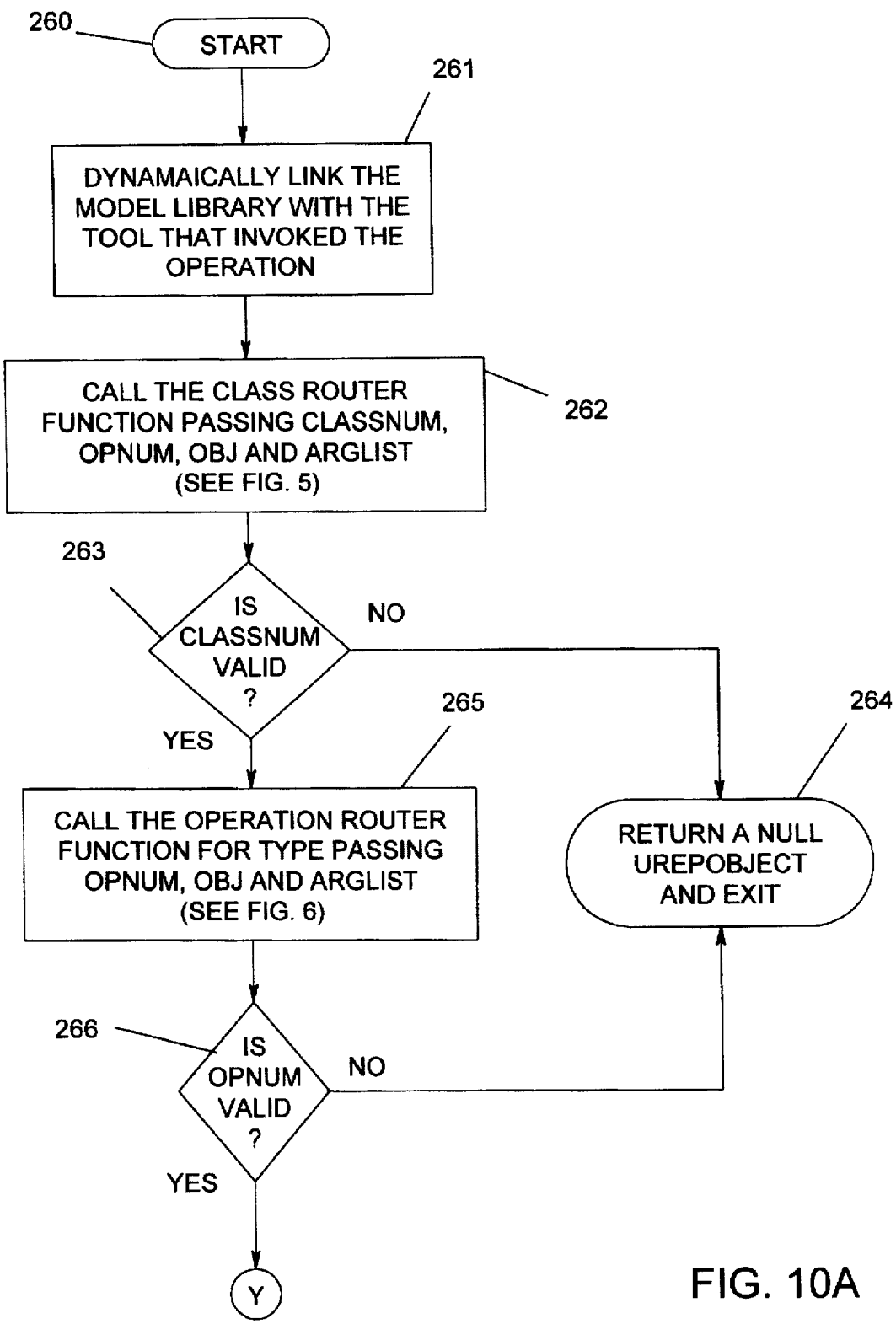
FIGS. 10A and 10B combined form is a flow chart illustrating the process for invoking the actual C++ procedure using the retrieved unique numbers and the generated router functions in the model library.
Figure 10B:
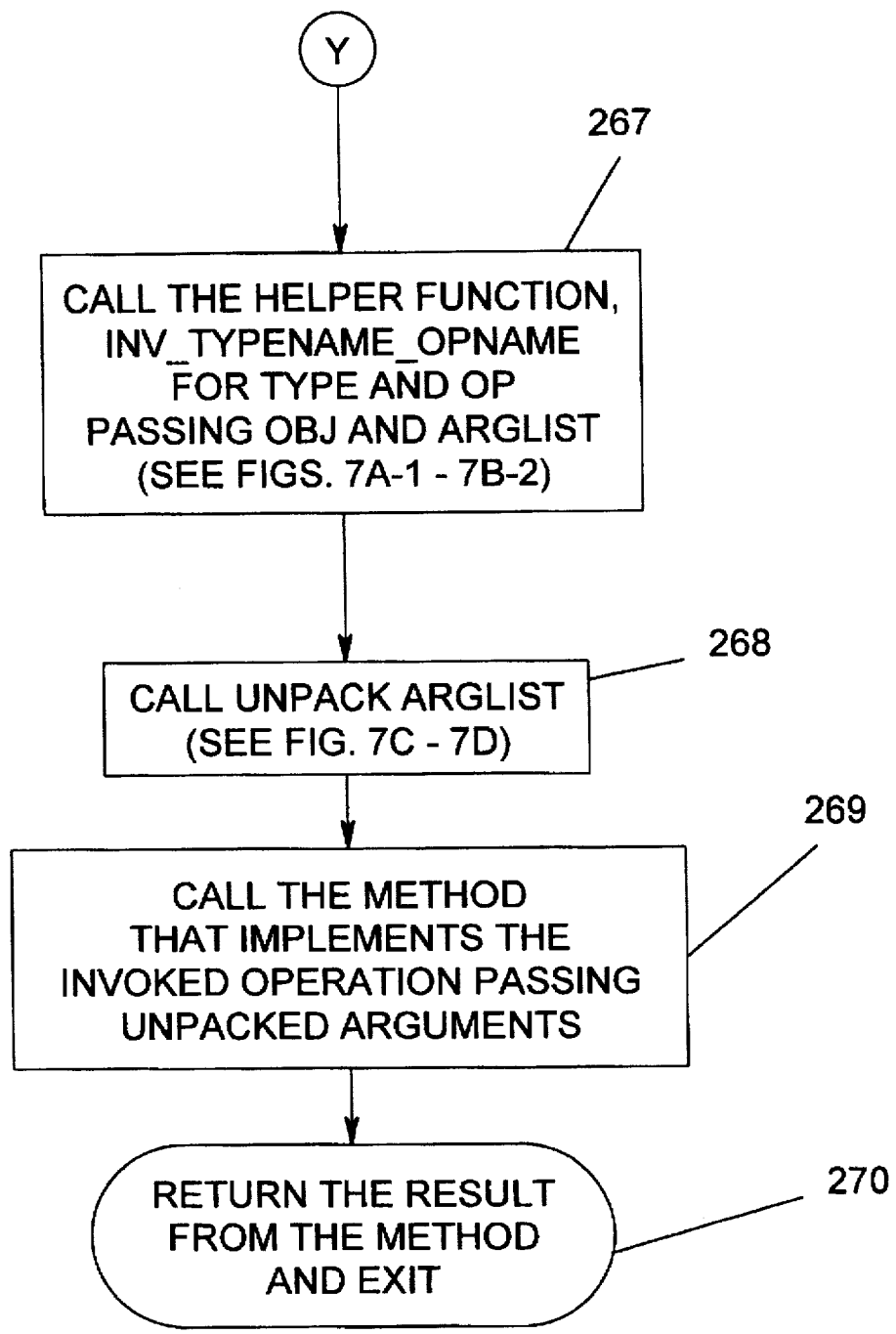

Referring now to FIGS. 10A and 10B, a flow chart is shown that illustrates the process for invoking the actual C++ procedure using the retrieved unique numbers and the generated router functions in the model library. The process begins with a START bubble 260 followed by a process step of dynamically linking the model library with the tool that invoked the operation (block 261). Next, the class router function passing CLASSNUM, OPNUM, OBJ and ARGLIST is called (block 262). After this an inquiry is made as to whether or not CLASSNUM is valid (diamond 263). If the answer to this inquiry is no, then a NULL UrepObject is returned and the process is exited (bubble 264). On the other hand, if the answer to this inquiry is yes, then the operation router function for TYPE passing OPNUM, OBJ and ARGLIST is called (block 265). Thus, by performing the above steps, the corresponding class router function is called using the class number passed as the parameter, and then the corresponding operation function is called from the class router function using the operation number passsed as a parameter.

Following the process step depicted by the process block 265, an inquiry is made as to whether or not OPNUM is valid (diamond 266). If the answer to this inquiry is no then a NULL UrepObject is returned and an EXIT is taken from the process (bubble 264). On the other hand, if the answer to this inquiry is yes, then a branch is taken to FIG. 10B at a connector Y wherein the helper function Inv___TYPENAME_OPNAME for TYPE and OP passing OBJ and ARGLIST is called (block 267). Next, the ARGLIST is unpacked (block 268). Following this, another process step of calling the method that implements the invoked operation passing the unpacked arguments is performed (block 269). Finally, the result from the process is returned and an EXIT is taken (bubble 270). Thus by performing the above steps, the corresponding helper function is called from the operation router function and then the corresponding method for the invoked operation is called.

Figure 11A:
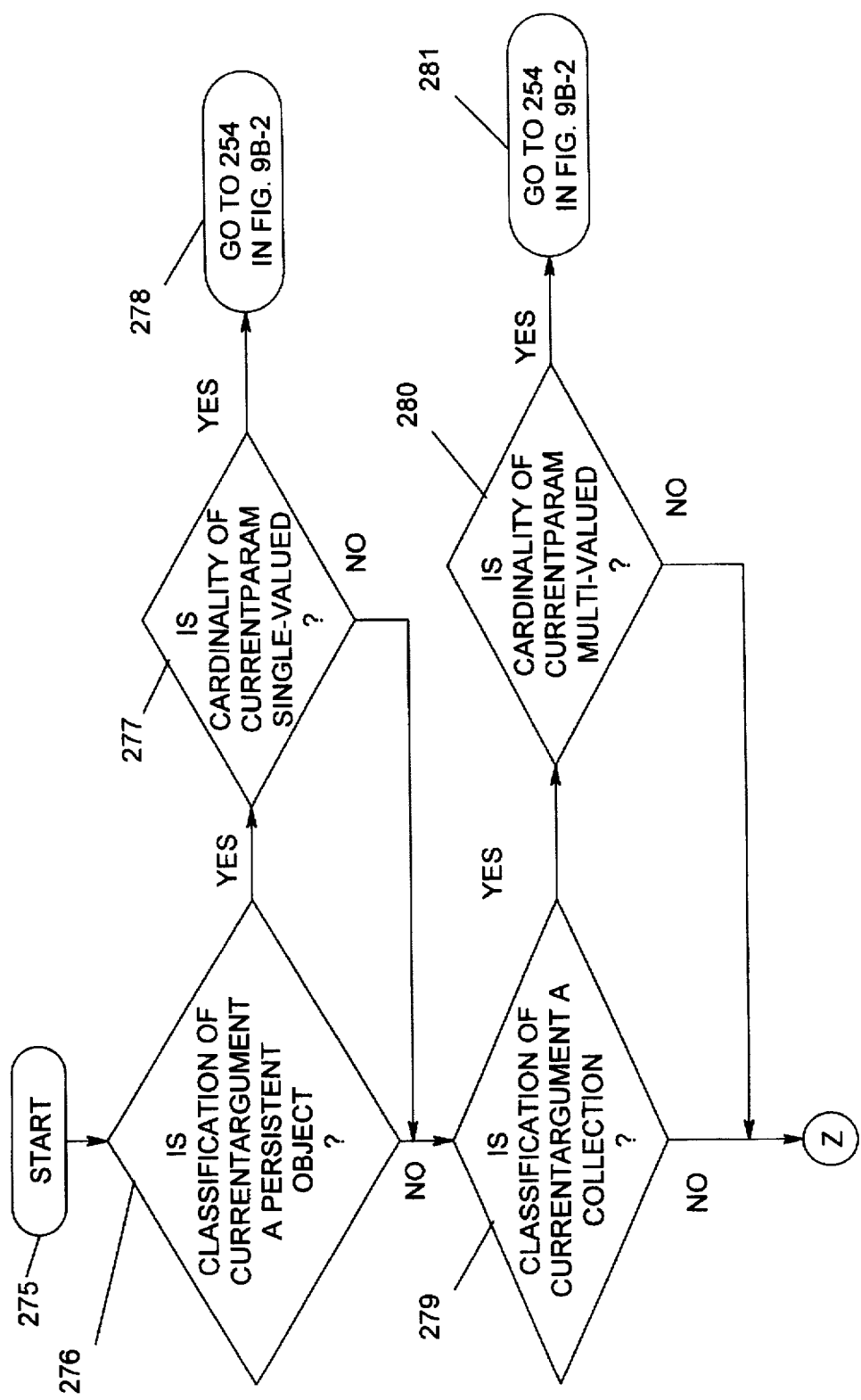
FIGS. 11A and 11B combined form is a flow chart illustrating the process for determining if the cardinality of currentParam and currentArgument is the same.
Figure 11B:
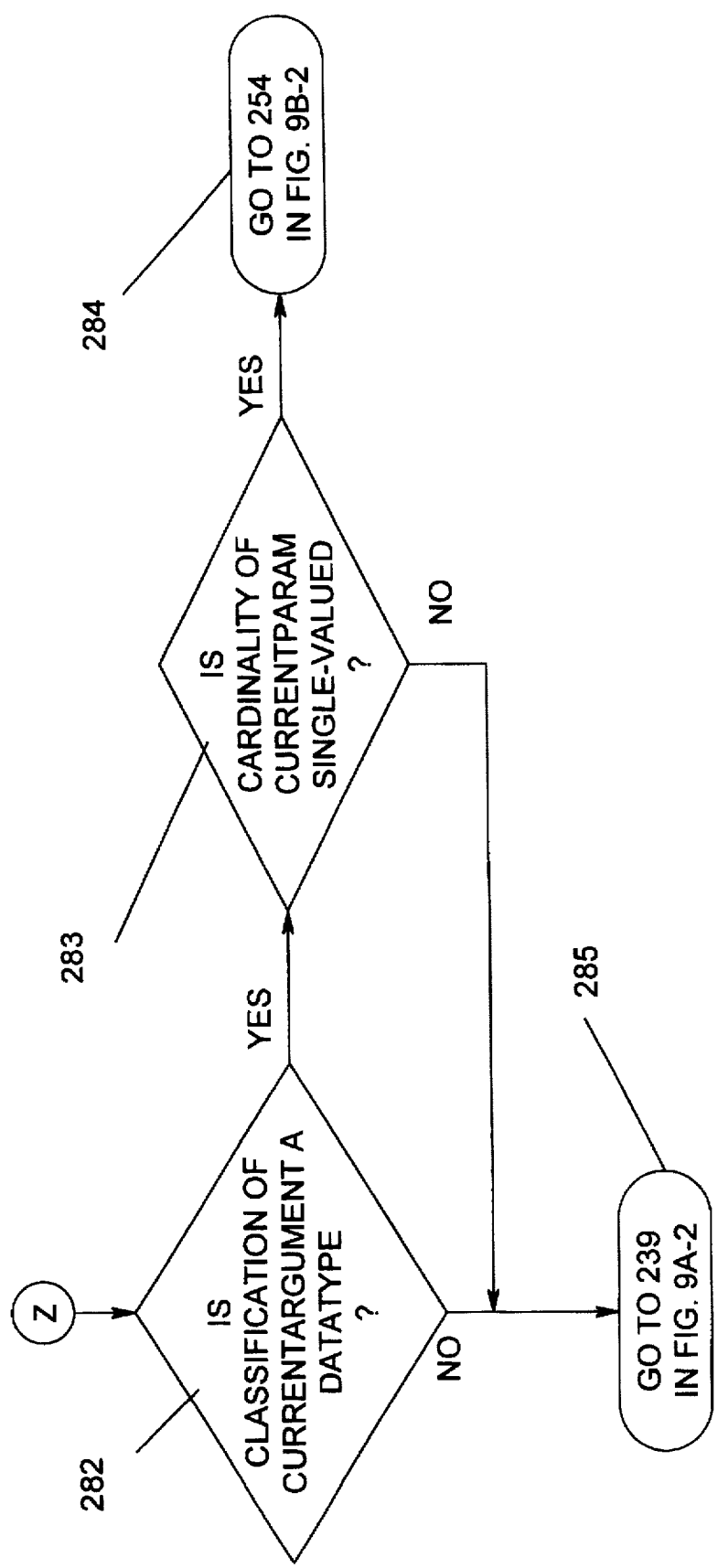

Referring now to FIGS. 11A and 11B, a flow chart illustrates the steps of the process for determining if the cardinality of currentParam and currentArgument is the same. The process begins with a start bubble 275 followed by an inquiry as to whether or not the classification of the currentArgument is a persistent object (diamond 276). If the answer to this inquiry is yes, then another inquiry is made as to whether or not the cardinality of the currentParam is single-valued (diamond 277). If the answer to this inquiry is yes, then a branch is taken back to the diamond 254 in FIG. 9B-2 (bubble 278). If the classification of currentArgument is not a persistent object, or if it is and the cardinality of the currentParam is not single-valued, then yet another inquiry is made as to whether or not the classification of the currentArgument is a collection (diamond 279). If the answer to this inquiry is yes, then still another inquiry is made as to whether or not the cardinality of the currentParam is multi-valued (diamond 280). If the answer to this latter inquiry is yes, then a branch is taken back to the diamond 254 in FIG. 9B-2 (bubble 281). That part of the process described above verifies the consistency of the currentParam and the currentArgument. If the currentArgument is a persistent object, then the cardinality of the currentParam must be single-valued. If the currentArgument is a collection, then the cardinality of the currentParam must be multi-valued. Otherwise, the signature validation for this parameter fails; that is, this is not the operation to be invoked and the process continues searching for the next matched operation.

On the other hand, if the classification of the currentArgument is not a collection, or if it is and the cardinality of the currentParam is not multi-valued, then a branch is taken to FIG. 11B at a connector Z wherein another inquiry is made as to whether or not the classification of the currentArgument is a dataType (diamond 282). If the answer to this inquiry is yes, then yet another inquiry is made as to whether the cardinality of the the currentParam is single-valued (diamond 283). If the answer to this latter inquiry is yes, then a branch is taken back to the diamond 254 in FIG. 9B-2 (bubble 284). On the other hand, if the classification of the currentArgument is not a dataType, or if it is and the cardinality of the currentParam is not single-valued, then a branch is taken back to the diamond 239 in FIG. 9A as denoted by the connector J. This part of the process verifies the consistency of the cardinality of the currentParam and the currentArgument. If the currentArgument is a dataType, then the cardinality of the currentParam must be single-valued.

Figure 12A:
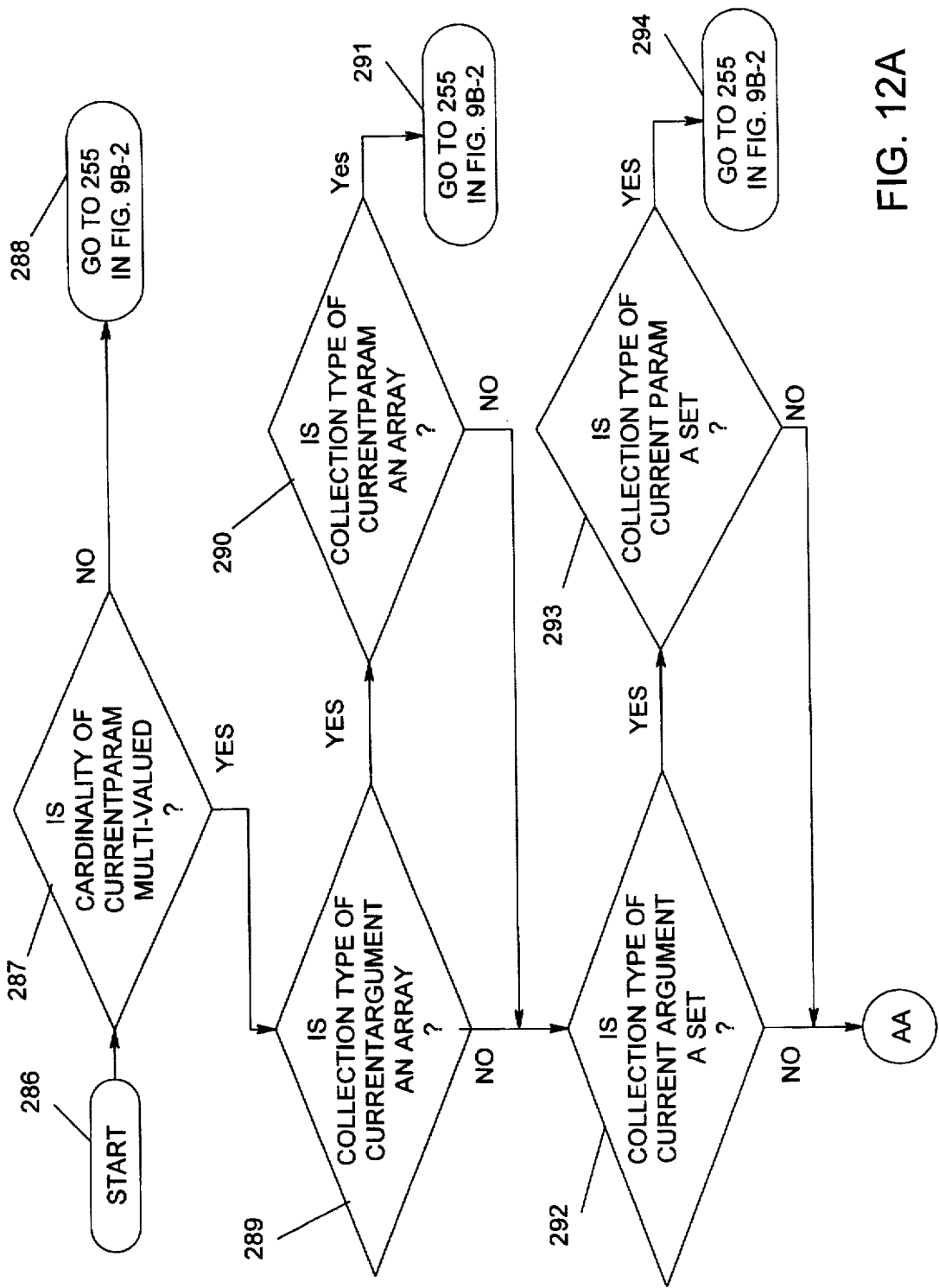

Referring now to FIGS. 12A and 12B, a flow chart is shown that illustrates the process for determining if the collectionType of the currentParam and the currentArgument are the same. The process begins with a START bubble 286, followed by an inquiry as to whether or not the cardinality of the currentParam is multi-valued (diamond 287). If the answer to this inquiry is no, then a branch is taken back to the diamond 255 in FIG. 9B-2 (bubble 288). On the other hand, if the cardinality is multi-valued, then another inquiry is made as to whether or not the collectionType of the currentArgument is an array (diamond 289). If the answer to this inquiry is yes, then yet another inquiry is made as to whether or not the collectionType of the currentParam is an array (diamond 290). If the answer to this latter inquiry is yes, then a branch is taken beck to the diamond 255 in FIG. 9B-2 (bubble 291). This part of the process verifies the consistency of the collectionType of the currentArgument and the currentParam only when the currentParam is multi-valued, and when the collectionType of the currentArgument is an array.

On the other hand, if the collectionType of the currentArgument is not an array, or it is and the collectionType of the currentArgument not an array, an inquiry is next made as to whether or not the collectionType of the currentArgument is a set (diamond 292). If the answer to this inquiry is yes, then another inquiry is made as to whether or not the collectionType of the currentParam is a set (diamond 293). If the answer to this latter inquiry is yes, then a branch is taken back to the diamond 255 in FIG. 9B-2 (bubble 294). On the other hand, if the collectionType of the currentArgument is not a set, or it is and the collectionType of the currentParam is not a set, then a branch is taken to FIG. 12B at a connector AA wherein still another inquiry is made as to whether or not the collectionType of the currentArgument is a list (diamond 295). If the answer to this inquiry is yes, then yet another inquiry is made as to whether or not the collectionType of the currentParam is a list.

If the answer to this latter inquiry is yes, then a branch is taken back to the diamond 255 in FIG. 9B-2 (bubble 297). On the other hand, if the collectionType of the currentArgument is not a list, then a return of FALSE is made (bubble 298). If the collectionType of the currentArgument is not a list and the collectionType of the currentParam is also not a list, then an inquiry is made as to whether or not the collectionType of the the currentParam is a uniqueList (diamond 299). If the answer to this latter inquiry is yes, then a return is made back to step 255, FIG. 9B-2 (bubble 300). On the other hand, if the answer to this latter inquiry is no, then a branch is taken back to the diamond 239 in FIG. 9A-2 as denoted by the connector V. This part of the process verifies the consistency of the collectionType of the currentArgument and the currentParam for the case of the currentArgument being a collectionType of set and list.

Figure 13A:
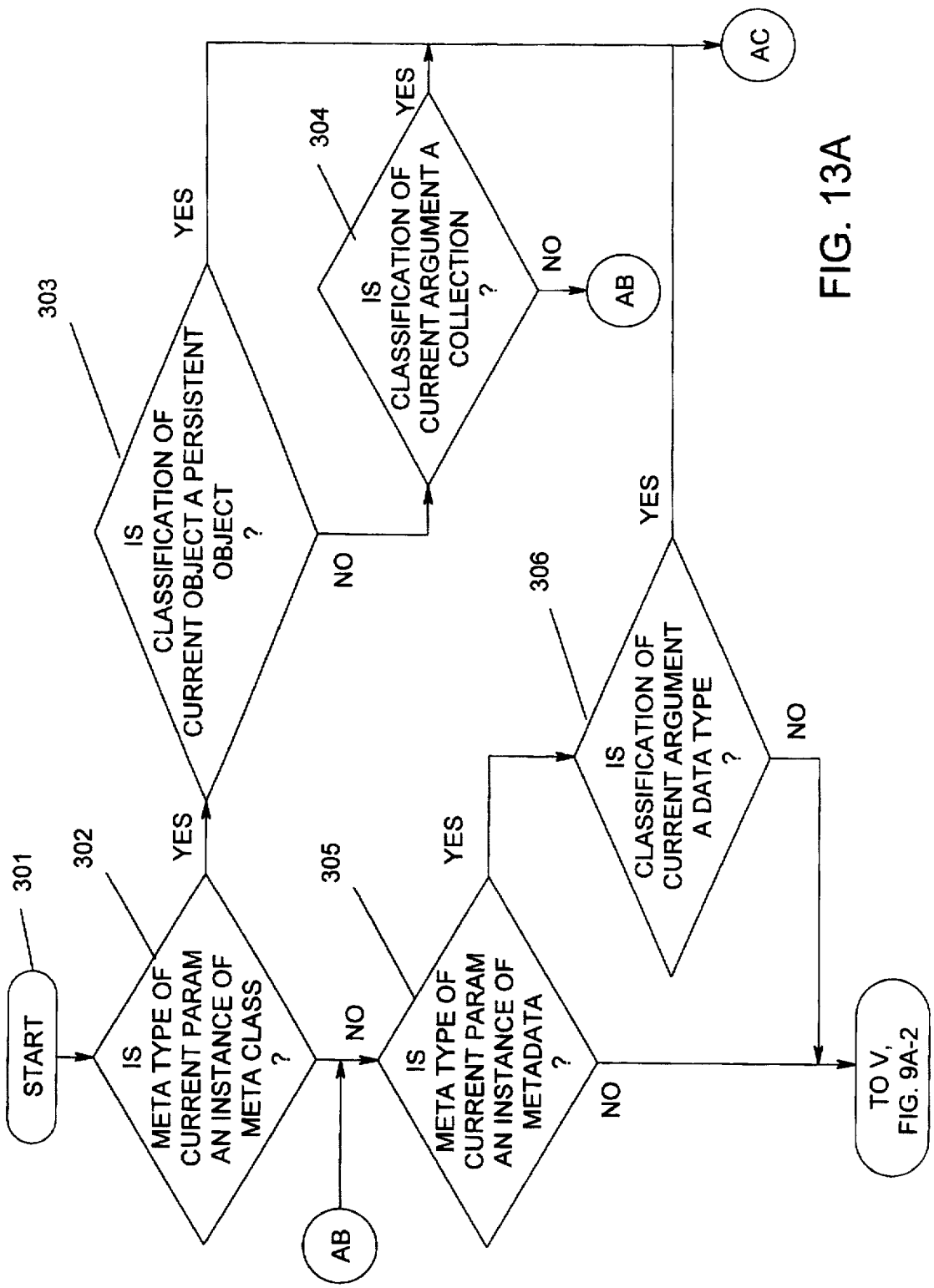
FIG. 13A and 13B combined form is a flow chart illustrating the process for determining if the classification of currentParam and currentArgument is the same, and the process for determining if metaClass of currentParam and currentArgument is the same or a subclass.
Figure 13B:
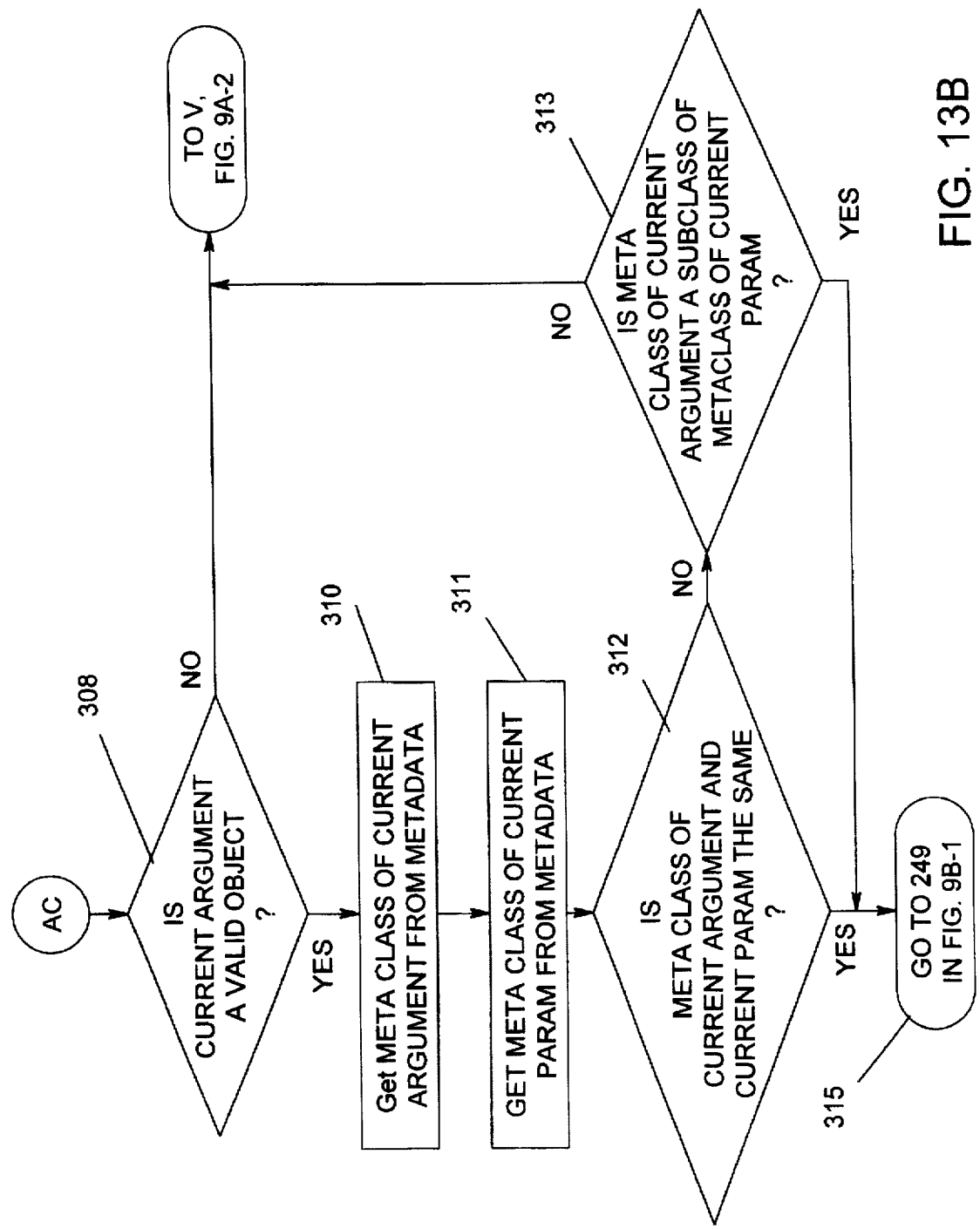

Referring now to FIGS. 13A and 13B, a flow chart illustrating the process for determining if the classification of the currentParam and the currentArgument is the same, and the process for determining if the metaClass of the currentParam and the currentArgument is the same or is it a subclass. The process begins with a start bubble 301, followed by an inquiry as to whether or not metaType of the currentParam is an instance of metaClass (diamond 302). If the answer to this inquiry is yes, then another inquiry is made as to whether or not classification of the currentArgument is a persistent object (diamond 303). If the answer to this latter inquiry is no, then yet another inquiry is made as to whether or not classification of currentArgument is a collection (diamond 304). If the answer to this inquiry is no, then a branch is taken to still another inquiry as to whether or not metaType of currentParam is an instance of metadata (diamond 305 via connector AB). This part of the process verifies the consistency of the metataype of the currentParam and the classification of the currentArgument for the case of the metatype of the currentParam being an instance of metaclass.

If the metaType of the currentParam is not an instance of the metaClass (diamond 302), then another inquiry is made as to whether or not the metatype of the currentParam is an instance of metadata (diamond 305). If the answer to this inquiry is yes, then another inquiry is made as to whether or not classification of the currentArgument is a data type (diamond 306). If the metaType of the currentParam is not an instance of metadata, or if it is and the classification of currentArgument is not a data type, then a branch is taken back to the diamond 239 in FIG. 9A-2 as denoted by the connector V. This part of the process verifies the consistency of the metatype of currentParam and the classification of the currentArgument for the case of the metatype of the currentParam being an instance of metadata.

Referring back to the diamonds 303 and 304, if the metatype of the currentParam is an instance of metaclass and if the classification of the currentArgument is a persistent object or if the classification of the currentArgument is a collection; and, referring back to the diamond 306, if the metatype of the currentParam is an instance of metadata and if classification of currentArgument is a datatype, then a branch is taken to FIG. 13B at a connector AC wherein an inquiry is next made as to whether or not the currentArgument is a valid object (diamond 308). If the answer to this inquiry is no, then a branch is taken back to the diamond 239 in FIG. 9A-2 as denoted by the connector V. On the other hand, if the currentArgument is a valid object, then a process step of getting the metaClass of the currentArgument from metadata is performed (block 310). Next, another process step of getting the metaClass of the currentParam from metadata is performed (block 311). Following this, an inquiry is made as to whether or not the metaClass of the currentArgument and the currentParam are the same (diamond 312). If the answer to this inquiry is no, then another inquiry is made as to whether or not the metaClass of the currentArgument is a subclass of metaClass of currentParam (diamond 313). If the answer to this latter inquiry is no, then a branch is taken back to the diamond 239 in FIG. 9A-2 as denoted by the connector V. On the other hand, if the metaClass of currentArgument and currentParam are the same, or if they are not and the metaClass of the currentArgument is a subclass of the metaClass of currentParam, then a branch is taken back to the diamond 249 in FIG. 9B-1. (bubble 315). This part of the process verifies the consistency of the metaClass of the currentParam and currentArgument. The signature validation for this parameter passes when the metaclass of the currentArgument is the same as or a subclass of the metaclass of the currentParam.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computer system having a user interface, a memory, a repository and a database, a repository program operating in said computer system for generically invoking operations on objects stored in said repository, said program executing a method comprising the steps of:

a. assigning a first set of unique numbers for each type in a model and a second set of unique numbers for each operation in each type;

b. storing said first and second sets of unique numbers in metadata of said repository;

c. generating router and helper functions that translate a generic call to an actual C++ procedure at run time using one of said first and one of said second unique numbers, and compiling and linking said router and helper functions in a library of said model;

d. using a search routine, traversing type hierarchy to find operation to be invoked;

e. if said to be invoked operation is found, using a validation routine, verifying signature of said found operation;

f. if said signature is verified, validating static versus non-static call, required versus optional for each parameter, and security access of said operation g. if said operation is invokable, retrieving from said metadata said one of said first and said one of said second unique numbers used in step c hereof;

h. using said one of said first and one of said second unique numbers and said generated router and helper functions in said library of said model, invoking actual C++ procedure; and, i. repeating steps d through h hereof for each operation invoked, and returning a result thereof.

2. A method as in claim 1 wherein said step of assigning said unique numbers further includes the steps of:

a. setting typeNumber equal to one;
b. for each type, TYPE, in said model:
  i) getting name, TYPENAME, of TYPE;
  ii) generating a name macro that defines N_TYPENAME to be typeNumber;
  iii) incrementing typeNumber by one; and
  iv) if there are more types, repeating steps b.i) through b.iii);
c. if there are no more types, for each type, TYPE, in said model:
  i) getting name, TYPENAME, of TYPE;
  ii) setting operationNumber equal to one;
d. for each public operation, OP, in TYPE:
  i) getting name, OPNAME, of OP;
  ii) generating a name macro that defines N_TYPENAME_OPNAME to be operationNumber;
  iii) incrementing opertionNumber by one;
  iv) if there are more operations, repeating steps d.i) through d.iii);
e. if there are more types, repeating steps c.i) through d.i), ii) and iii).

3. A method as in claim 1 wherein said step of storing said unique numbers in metadata further includes the steps of:

a. for each type, TYPE, in the model:
  i) getting name, TYPENAME, of TYPE;
  ii) generating a helper function, GetId_TYPENAME that returns N_TYPENAME;
  iii) if there are more types, repeating steps a.i) through a.ii);
b. if there are no more types, for each type, TYPE, in the model;
  i) getting name, TYPENAME, of TYPE;
  ii) for each public operation OP in TYPE, getting name, OPNAME, of OP;
  iii) generating a helper function, GetId_TYPENAME_OPNAME that returns N_TYPENAME_OPNAME;
  iv) if there are more operations, repeating steps b.ii) through b.iii);
c. if there are no more operations and there are more types, repeating steps b.i) through b.iii);
d. if there are no more types, compiling said helper functions and linking them into said model library.

4. A method as in claim 1 further includes the steps of:

a. dynamically linking said model library with a tool that loads said metadata;
b. for each type, TYPE, in said model:
  i ) getting name, TYPENAME, of TYPE;
  ii) calling a helper function, GetId_TYPENAME in said library;
  iii) if said helper function call failed, storing a minus one for type in said metadata;
  iv) if said helper function call succeeded, storing unique number returned by said helper function for TYPE in said metadata;
  v) if there are more types, repeating steps b.i) through b.iv);
c. if there are no more types, for each type,TYPE, in said model:
  i. ) getting name, TYPENAME, of TYPE;
  ii.) for each public operation, OP, in TYPE:
    1. getting name, OPNAME, of OP;
    2. calling a helper function, GetId_TYPENAME_OPNAME in said library;
    3. determining if said function call succeeded, and if not, storing a minus one for OP in said metadata;
    4. if said function call succeeded, storing unique number returned by said helper function for OP in said metadata;
    5. determining if there are more operations, and if so, repeating steps c.ii)1. through c.ii)4; and,
  iii) determining if there are more types, and if so, repeating steps c.i) through c.ii).

5. A method as in claim 1 wherein said step of generating router functions further comprises:

a. getting name, MODEL, of model;
b. generating start of class router function as:

```
extern "C" {
UrepObject*
inv_MODEL
   (int classNumber, int operationNumber,
UrepPersistentObject & myself, UrepArgumentList & argList)
   };
``` c. generating switch statement based on classNumber passed as parameter;
d. for each type, TYPE, in said model:
  i) getting name, TYPENAME, of TYPE;
  ii) generating case statement based on N_TYPENAME that calls an operation router function, Inv_TYPENAME for TYPE;
  iii) determining if there are more types, and if so, repeating steps d.i) through d.ii);
e. if there are no more types, generating a default case statement that returns a NULL UrepObject;
f. generating a statement that returns the result from the operation router function;
g. generating an end of class router function and,
  };
  };; and,
h. compiling and linking said class router function into said model library.

6. A method as in claim 1 wherein said step of generating router functions further includes the steps of:

a. for each type, TYPE, in said model:
  i) getting name, TYPENAME, of TYPE;
  ii) generating start of operation router function as:

```
Inv_TYPENAME (Int operationNumber,
UrepPersistentObject & myself, UrepArgumentList, argList)
   {;
``` iii) generating a switch statement based on operationNumber passed as parameter;
  iv) for each public operation, OP, of TYPE:
    1. getting name, OPNAME, of OP;
    2. generating a case statement based on N_TYPENAME_OPNAME that calls a corresponding helper function for TYPE of OP;
    3. determining if there are more operations, and if so, repeating steps iv) 1. through iv)3;
  v) if there are no more operations, generating a default case statement that returns a NULL UrepObject;
  vi) generating a statement that returns the result from said helper function;

vii) generating end of operation router function as:
};;
viii) determining if there are more types, and if so repeating steps all of the preceding steps hereof;
b. compiling and linking said operation router functions into said model library.

7. A method as in claim 1 wherein said step of generating helper functions further includes the steps of:
a. for each type, TYPE, in said model:
I) getting name, TYPENAME, of TYPE;
ii) for each public operation, OP, in TYPE:
1. getting name, OPNAME, of OP;
2. determining if OP is static, and if so, constructing a NULL surrogate object of TYPE;
3. generating start of helper function for UrepPersistentObject and myself, UrepArgumentList and argList;
4. if OP is not static, constructing a surrogate object, STYPE of TYPE;
5. calling a routine, unpackArgumentList;
6. performing error checks on STYPE and on unpacked arguments, if needed;
7. determining if any errors were found, and if so, determining if there are any return types, and if so, generating a statement that returns a NULL UrepObject, and if not, generating a return statement;
7. if no errors were found, determining if there are any return type, and if not, calling method that implements invoked operation by passing said unpacked arguments;
8. generating a statement that returns a NULL UrepObject and generating end of said helper function as };;
9. if there are return types, allocating memory for return type;
10. calling method that implements invoked operation by passing said unpacked arguments;
11. storing result in said allocated memory;
12. generating end of said helper function as };;and,
13. determining if there are more operations, and if so, repeating steps a.ii) 1. through a.ii) 13 hereof;
iii) if there are no more operations, determining if there are more types, and if so repeating all steps of this claim; and,
b) if there are no more types, compiling and linking said helper functions into said model library.

8. A method as in claim 7 wherein said step of calling a routine, unpackArgumentList, further includes the steps of:
a. for each parameter, PARAM, in OP:
i) declaring a local variable, VAR, of PARAM type;
ii) calling extract argument to get current argument, ARG, from said argumentList;
iii) determining if PARAM is single-valued, and if so, determining if PARAM is a Urep data type;
iv) if PARAM is not a Urep data type, determining if PARAM is a Urep Persistent Object;
v) if PARAM is not a Urep Persistent Object, assigning ARG to VAR; and,
vi) determining if there are more parameters, and if so, return to step a. ii) 6 of this claim.

9. A method as in claim 8 wherein if it is determined in step a.iii) thereof that PARAM is a Urep data type, said method further includes the following steps:
a. determining if PARAM is optional;
b. if PARAM is not optional, determining if PARAM is a Urep Persistent Object, and if not, typecasting ARG to PARAM_TYPE and assigning it to VAR;
c. if PARAM is not optional, and PARAM is a Urep Persistent Object, constructing a surrogate object of type TYPE from ARG and assigning it to VAR;
d. if PARAM is optional, determining if ARG is NULL;
e. if ARG is NULL, constructing a NULL surrogate object of type TYPE and assigning it to VAR;
f. determining if there are more parameters, and if so, repeating all steps of claims 8 and 9 hereof; and,
g. if there are no more parameters, returning to step a. ii) 6. of claim 7.

10. A method as in claim 1 wherein said step of traversing type hierarchy further includes the steps of:
a. determining if pass in operationName is null, and if so, returning a NULL UrepObject and exiting said process;
b. if said pass in operationName is not null, determining if invoking object, OBJ, is valid, and if not returning a NULL UrepObject and exiting said process;
c. if OBJ is valid, determining if given class and model is an instance in metaClass, and if not, returning a NULL UrepObject and exiting said process;
d. if given class and model is an instance in metaClass, determining if given operation name is "construct", and if yes, determining if given type is an abstract class, and if so, returning a NULL UrepObject and exiting said process;
e. if given operation name is not construct and is not an abstract class, determining if given operationName is found in type hierarchy, and if not, returning a NULL UrepObject and exiting said process; and,
f. if given operationName is found in type hierarchy, determining if signature is valid, and if not, determining if search is to the root of type hierarchy, and is yes, returning a NULL UrepObject and exiting said routine.

11. A method as in claim 10 wherein signature is valid, said method further including the following steps:
a. determining if said operation is defined as classFeature in said metadata, and if no, determining if call is via non-static invokeOperation, and if no, returning a NULL UrepObject and exiting said process;
b. if said operation is defined is defined as classFeature, determining if said call is via static invokeOperation, and if no, returning a NULL UrepObject and exiting said process;
c. if said call is via static invokeOperation for said operation defined as classFeature, retrieving requiredProperty of each parameter from said metadata;
d. determining if requiredProperty of this parameter is TRUE, and if yes, determining if argument passed is a NULL UrepObject, and if yes, returning a NULL UrepObject and exiting said process;
e. if requiredProperty is not TRUE, determining if there are more parameters, and if so, repeating steps c and d hereof;
f. if there are no more parameters, retrieving accessProperty of said operation; and,
g. determining if publicAccess is defined for said operation, and if no, returning a NULL UrepObject and exiting said process.

12. A method as defined in claim 11 wherein if publicAccess is defined for said operation, futher including the steps of:
a. retrieving a unique number, CLASSNUM, of given type, TYPE, from said metadata; and,
b. retrieving a unique number, OPNUM, of given operation, OP, from said metadata.

13. A method as in claim 1, wherein said step of traversing type hierarchy further includes the steps of:
   a. finding entry point of type in type hierarchy;
   b. getting number of parameters in argumentList, ARGLIST;
   c. defining classList, featureList and parameterList;
   d. setting found equal to FALSE;
   e. determining if class level found is TRUE, and if not, determining if search is exhausted in classList, and yes, returning a NULL UrepObject and exiting said process;
   f. if search is not exhausted in classList, setting currentClass as next entry in classList;
   g. adding superclasses of said currentClass to end of classList;
   h. setting currentFeature from featureList and determining if currentFeature is an instance of metaOperation;
   i. initiating featureList with all meta features of said currentClass;
   j. if currentFeature is not an instance of metaOperation, determining if search is exhausted in featureList, and if not, getting next entry of featureList;
   k. if currentFeature is an instance of metaOperation, determining if featureName is same as said operationName, and if yes;
   l. initiating paramList with metaParameters of currentFeature; and,
   m. determining if number of parameter is same as defined in metadata of currentFeature, and if not, repeating steps i through m hereof.

14. A method as in claim 13, wherein if number of parameters is same as defined in metadata of currentFeature, further including the steps of:
   a. determining if argumentList contains zero parameter, and if yes, determining if number of parameter set for said operation in metadata is equal to zero, and if so, setting found equal to TRUE, returning to step e of claim 13;
   b. if number of parameter set for said operation in metadata is not equal to zero, returning to step j of claim 13;
   c. if argumentList does not contain zero paraameter:
      i) resetting argumentList pointing to first argument;
      ii) determining if all parameters are verified, and if yes, setting found to TRUE and returning to step e of claim 13;
      iii) if all parameters are not verified, setting currentArgument as next entry from argumentList;
      iv) setting currentParam from paramList;
      v) determining if cardinality of currentParam and currentArgument are the same, and if not, returning to step I of claim 13;
      vi) if cardinality of currentParam and currentArgument are the same, determining if collectionType of said currentParam and said currentArgument are the same, and if not, returning to step i of claim 13;
      vii) if collectionType of said currentParam is the same as currentArgument, determining if classification of said currentParam is the same as said currentArgument, and if not, returning to step i of claim 13;
      viii) if classification of said currentParam is the same as said currentArgument, determining if metaClass of currentParam is the same as currentArgument or subclass, and if not, returning to step i of claim 13; and,
      ix) if metaClass of said currentParam is the same as currentArgument or subclass, returning to step c. ii) of this claim 14.

15. A method as in claim 1 wherein step h thereof further includes the steps of:
   a. dynamically linking said model library with tool that invoked said operation;
   b. calling class router function passing CLASSNUM, OPNUM, OBJ and ARGLIST;
   c. determining if CLASSNUM is valid, and if not, returning a NULL UrepObject and exiting said process;
   d. if CLASSNUM is valid, calling operation router function for TYPE, passing OPNUM, OBJ and ARGLIST;
   e. determining if OPNUM is valid, and if not, returning a NULL UrepObject and exiting said process;
   f. if OPNUM is valid, calling a helper function, Inv_TYPENAME_OPNAME for TYPE and OP passing OBJ and ARGLIST;
   g. calling said unpack ARGLIST routine;
   h. calling procedure that implements said invoked operation passing unpacked arguments; and,
   i. returning result of said procedure in the preceding step and exiting said process.

16. A method as in claim 14 wherein said step of determining if cardinality of currentParam is the same as currentArgument further includes the steps of:
   a. determining if classification of said currentArgument is a persistent object, and if yes, determining if cardinality of said currentParam is single-valued, and if yes, returning to step c.vi) of claim 14;
   b. if classification of said currentArgument is not a persistent object, and cardinality of said currentParam is not single-valued, determining if classification of currentArgument is a collection, and if yes;
   c. determining if cardinality of said currentParam is multi-valued, and if yes, returning to step c.vi) of claim 14;
   d. if classification of said currentArgument is not a collection, and cardinality of currentParam is not multi-valued, determining if classification of said currentArgument is a dataType, and if yes;
   e. determining if cardinality of said currentParam is single-valued, and if yes, returning to step c.vi) of claim 14; and,
   f. if classification of said currentArgument is not a dataType and cardinality of said currentParam is not single-valued, returning to step c.vi) of claim 14.

17. A method as in claim 14 wherein said step of determining if collectionType of said currentParam is the same as said currentArgument further includes the steps of:
   a. determining if cardinality of said currentParam is multi-valued, and if not, returning to step c.vii) of claim 14;
   b. if cardinality of said currentParam is multi_valued, determining if collectionType of said currentArgument is an array, and if yes, determining if collectionType of said currentParam is an array, and if yes, returning to step c.vii) of claim 14;
   c. if collectionType of said currentArgument is not an array, and collectionType of currentParam is not an array, determining if collectionType of said currentArgument is a set, and if yes, determining if collectionType of said currentParam is a set, and if yes, returning to step c.vii) of claim 14;

d. if collectionType of said currentArgument is not a set, and collectionType of said currentParam is not a set, determining if collectionType of said currentArgument is a list, and if yes, determining in collectionType of said currentParam is a list, and if yes, returning to step c. vii) of claim 14;

e. if collectionType of said currentArgument is not a list, returning to step i of claim 13; and, f. if collectionType of said currentParam is not a list, determining if collectionType of said currentParam is a unique list, and if yes, returning to step c.vii) of claim 14, otherwise, returning to step i of claim 13.

18. A method as in claim 14 wherein said step of determining if classification of said currentParam is the same as currentArgument further includes the steps of:

a. determining if metaType of said currentParam is an instance of metaClass, and if yes, determining if classification of said currentArgument is a persistent object;

b. if classification of said currentArgument is not a persistent object, determining if classification of said currentArgument is a collection;

c. if metaType of said currentParam is not an instance of metaClass, determining if metaType of said currentParam is an instance of metadata, and if yes;

d. determining if classification of currentArgument is a data type;

e. if metaType of said currentParam is not an instance of metadata, and classification of said currentARgument is not a data type, returning to step i of claim 13; and f. if classification of said currentArgument is not a collection, returning to step c hereof.

19. A method as in claim 18, wherein said step c. viii) in claim 14 further includes the steps of:

a. determining if said currentArgument is a valid object, and if not returning to step i of claim 13;

b. if said currentArgument is a valid object, getting metaClass of said currentArgument from said metadata;

c. getting metaClass of said currentParam from said metadata;

d. determining if metaClass of said currentArgument is the same as said currentParam, and if no, determining if metaClass of said currentArgument is a subclass of metaClass of said currentParam, and if not, returning to step i of claim 13; and, e. if said metaClass of said currentArgument is the same as said currentParam, and said metaClass of said currentArgumentis a subclass of said metaClass of said currentParam, returning to step c.ii) of claim 14.

20. A method as in claim 9 wherein if said ARG is not NULL, determining if PARAM is a Urep PersistentObject, and if so, constructing a surrogate object of type, TYPE, from ARG, and assigning it to VAR.

21. A method as in claim 11 wherein said call is via non-static invokeOperation for said operation defined as non-classFeature, repeating steps d through g of claim 11.

22. A method as in claim 11 wherein said requiredProperty is TRUE and argument passed is not true, repeating steps f and g of claim 11.

23. A method as in claim 13 wherein class level found is TRUE, returning to step a in claim 11.

24. A method as in claim 18 wherein if classification of said currentArgument is a persistentObject, returning to step a in claim 19.

25. A method as in claim 18 wherein if classification of said currentArgument is a collection, returning to step a in claim 19.

26. A method as in claim 18 wherein if classification of said currentArgument is a data type, returning to step a in claim 19.

* * * * *